(12) United States Patent
Katami et al.

(10) Patent No.: US 11,580,004 B2
(45) Date of Patent: *Feb. 14, 2023

(54) INFORMATION PROCESSOR, INFORMATION PROCESSING METHOD, AND NON-TRANSITORY STORAGE MEDIUM

(71) Applicant: JVCKENWOOD Corporation, Yokohama (JP)

(72) Inventors: Kenji Katami, Yokohama (JP); Ichiro Shishido, Yokohama (JP); Reiichi Mannen, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 23 days.

This patent is subject to a terminal disclaimer.

(21) Appl. No.: 17/394,462

(22) Filed: Aug. 5, 2021

(65) Prior Publication Data

US 2021/0365349 A1    Nov. 25, 2021

Related U.S. Application Data

(63) Continuation of application No. 16/664,973, filed on Oct. 28, 2019, now Pat. No. 11,119,880.

(30) Foreign Application Priority Data

Oct. 31, 2018 (JP) .............. JP2018-205364

(51) Int. Cl.
 *G06F 11/34* (2006.01)
 *G06F 11/32* (2006.01)

(52) U.S. Cl.
 CPC ........ *G06F 11/3438* (2013.01); *G06F 11/321* (2013.01); *G06F 11/323* (2013.01); *G06F 11/324* (2013.01)

(58) Field of Classification Search
 CPC ............. H04L 41/0813; G06F 11/3419; G06F 11/3452; G06F 11/3003; G06F 1/3225; G06F 8/71

See application file for complete search history.

(56) References Cited

U.S. PATENT DOCUMENTS

2012/0054333 A1   3/2012   Vichare et al.
2012/0266128 A1   10/2012  Kato
(Continued)

FOREIGN PATENT DOCUMENTS

JP   2003-345487   12/2003
WO  2011/055801   5/2011

OTHER PUBLICATIONS

Non-Final Office Action for U.S. Appl. No. 16/664,973 dated Aug. 20, 2020.
(Continued)

*Primary Examiner* — Mahran Y Abu Roumi
(74) *Attorney, Agent, or Firm* — Amin, Turocy & Watson, LLP

(57) ABSTRACT

An information processor includes an operation history obtaining unit configured to obtain operation histories created user operations at a terminal device; a function identifying unit configured to, based on the obtained operation histories, identify a function performed by the user operations as an operation target function; an operation extracting unit configured to, based on information about the operation target function identified by the function identifying unit, extract predetermined operation histories from the obtained operation histories; an index calculating unit configured to calculate an index which indicates a level of efficiency of the operations for the operation histories extracted by the operation extracting unit; an operation selecting unit configured to, based on the index, select the operation histories having a predetermined efficiency; and an output controller config- (Continued)

OPERATION HISTORY TABLE (INFORMATION PROCESSING DEVICE)

| OPERATION SUBJECT ID | OPERATION TIME | OPERATION TARGET | OPERATION DETAILS, OPERATION RESULT | |
|---|---|---|---|---|
| OP1 | A | 01-15-2018 13:00:00.000 | DISPLAY | WINDOW W1 | |
| OP2 | A | 01-15-2018 13:00:02.000 | MOUSE | SCROLLING, MOVEMENT AMOUNT: 80 | |
| OP3 | A | 01-15-2018 13:00:03.000 | MOUSE | LEFT SINGLE CLICK | |
| OP4 | A | 01-15-2018 13:00:04.000 | KEYBOARD | KEYSTROKE COUNT: 8 | T1 |
| OP5 | A | 01-15-2018 13:00:05.000 | MOUSE | SCROLLING, MOVEMENT AMOUNT: 50 | |
| OP6 | A | 01-15-2018 13:00:06.000 | MOUSE | LEFT SINGLE CLICK | |
| OP7 | A | 01-15-2018 13:00:06.100 | STORAGE | ADDRESS: A00100 VALUE: 0x55 | |
| OP8 | A | 01-15-2018 13:00:10.000 | MOUSE | SCROLLING, MOVEMENT AMOUNT: 60 | |
| OP9 | A | 01-15-2018 13:00:11.000 | MOUSE | LEFT SINGLE CLICK | |
| OP10 | B | 01-15-2018 13:00:12.000 | DISPLAY | WINDOW W2 | |
| OP11 | B | 01-15-2018 13:00:14.000 | MOUSE | SCROLLING, MOVEMENT AMOUNT: 50 | T2 |
| OP12 | B | 01-15-2018 13:00:15.000 | MOUSE | LEFT SINGLE CLICK | |
| OP13 | B | 01-15-2018 13:00:15.100 | STORAGE | ADDRESS: A00500 VALUE: 0x00 | | ured to output a guide information based on the operation histories selected by the operation selecting unit.

13 Claims, 17 Drawing Sheets

(56) References Cited

U.S. PATENT DOCUMENTS

| | | |
|---|---|---|
| 2013/0325913 A1 | 12/2013 | Kusaka et al. |
| 2014/0019914 A1 | 1/2014 | Amano |
| 2014/0317254 A1* | 10/2014 | Iizuka ................ H04L 41/0813 709/221 |
| 2014/0325481 A1* | 10/2014 | Pillai .................. G06F 11/3003 717/124 |
| 2014/0371921 A1 | 12/2014 | Weaver et al. |
| 2018/0321652 A1 | 11/2018 | Jablokov et al. |

OTHER PUBLICATIONS

Japanese Office Action for Japanese Patent Application No. 2018-205364 dated Dec. 7, 2021.
Katami, et al., filed Aug. 5, 2021, Information Processor, Information Processing Method, and Non-Transitory Storage Medium.

* cited by examiner

OPERATION HISTORY TABLE (TERMINAL DEVICE)

|  | OPERATION TIME | OPERATION TARGET | OPERATION DETAILS, OPERATION RESULT |
| --- | --- | --- | --- |
| OP1 | 01-15-2018 13:00:00.000 | DISPLAY | WINDOW W1 |
| OP2 | 01-15-2018 13:00:02.000 | MOUSE | SCROLLING, MOVEMENT AMOUNT: 80 |
| OP3 | 01-15-2018 13:00:03.000 | MOUSE | LEFT SINGLE CLICK |
| OP4 | 01-15-2018 13:00:04.000 | KEYBOARD | KEYSTROKE COUNT: 8 |
| OP5 | 01-15-2018 13:00:05.000 | MOUSE | SCROLLING, MOVEMENT AMOUNT: 50 |
| OP6 | 01-15-2018 13:00:06.000 | MOUSE | LEFT SINGLE CLICK |
| OP7 | 01-15-2018 13:00:06.100 | STORAGE | ADDRESS: A00100 VALUE: 0x55 |

FIG.7

FUNCTION ADDRESS INFORMATION TABLE

| START ADDRESS | END ADDRESS | FUNCTION |
|---|---|---|
| A00000 | A000FF | F1 |
| A00100 | A0011F | F2 |
| A00200 | A003FF | F3 |
| A00400 | A004FF | F4 |
| A00500 | A0057F | F5 |
| A00600 | A006FF | F4 |

FIG.8

OPERATION HISTORY TABLE (INFORMATION PROCESSING DEVICE)

| | OPERATION SUBJECT ID | OPERATION TIME | OPERATION TARGET | OPERATION DETAILS, OPERATION RESULT | |
|---|---|---|---|---|---|
| OP1 | A | 01-15-2018 13:00:00.000 | DISPLAY | WINDOW W1 | ⎫ |
| OP2 | A | 01-15-2018 13:00:02.000 | MOUSE | SCROLLING, MOVEMENT AMOUNT: 80 | |
| OP3 | A | 01-15-2018 13:00:03.000 | MOUSE | LEFT SINGLE CLICK | |
| OP4 | A | 01-15-2018 13:00:04.000 | KEYBOARD | KEYSTROKE COUNT: 8 | T1 |
| OP5 | A | 01-15-2018 13:00:05.000 | MOUSE | SCROLLING, MOVEMENT AMOUNT: 50 | |
| OP6 | A | 01-15-2018 13:00:06.000 | MOUSE | LEFT SINGLE CLICK | |
| OP7 | A | 01-15-2018 13:00:06.100 | STORAGE | ADDRESS: A00100 VALUE: 0x55 | ⎭ |
| OP8 | A | 01-15-2018 13:00:10.000 | MOUSE | SCROLLING, MOVEMENT AMOUNT: 60 | |
| OP9 | A | 01-15-2018 13:00:11.000 | MOUSE | LEFT SINGLE CLICK | |
| OP10 | B | 01-15-2018 13:00:12.000 | DISPLAY | WINDOW W2 | ⎫ |
| OP11 | B | 01-15-2018 13:00:14.000 | MOUSE | SCROLLING, MOVEMENT AMOUNT: 50 | T2 |
| OP12 | B | 01-15-2018 13:00:15.000 | MOUSE | LEFT SINGLE CLICK | |
| OP13 | B | 01-15-2018 13:00:15.100 | STORAGE | ADDRESS: A00500 VALUE: 0x00 | ⎭ |

FIG.9

OPERATION HISTORY TABLE (INFORMATION PROCESSING DEVICE)

| | OPERATION SUBJECT ID | FUNC- TION | OPERATION TIME | OPERATION TARGET | OPERATION DETAILS, OPERATION RESULT | |
|---|---|---|---|---|---|---|
| OP1 | A | F2 | 01-15-2018 13:00:00.000 | DISPLAY | WINDOW W1 | T1 |
| OP2 | A | F2 | 01-15-2018 13:00:02.000 | MOUSE | SCROLLING, MOVEMENT AMOUNT: 80 | |
| OP3 | A | F2 | 01-15-2018 13:00:03.000 | MOUSE | LEFT SINGLE CLICK | |
| OP4 | A | F2 | 01-15-2018 13:00:04.000 | KEYBOARD | KEYSTROKE COUNT: 8 | |
| OP5 | A | F2 | 01-15-2018 13:00:05.000 | MOUSE | SCROLLING, MOVEMENT AMOUNT: 50 | |
| OP6 | A | F2 | 01-15-2018 13:00:06.000 | MOUSE | LEFT SINGLE CLICK | |
| OP7 | A | F2 | 01-15-2018 13:00:06.100 | STORAGE | ADDRESS: A00100 VALUE: 0x55 | |
| OP8 | A | - | 01-15-2018 13:00:10.000 | MOUSE | SCROLLING, MOVEMENT AMOUNT: 60 | |
| OP9 | A | - | 01-15-2018 13:00:11.000 | MOUSE | LEFT SINGLE CLICK | |
| OP10 | B | F5 | 01-15-2018 13:00:12.000 | DISPLAY | WINDOW W2 | T2 |
| OP11 | B | F5 | 01-15-2018 13:00:14.000 | MOUSE | SCROLLING, MOVEMENT AMOUNT: 50 | |
| OP12 | B | F5 | 01-15-2018 13:00:15.000 | MOUSE | LEFT SINGLE CLICK | |
| OP13 | B | F5 | 01-15-2018 13:00:15.100 | STORAGE | ADDRESS: A00500 VALUE: 0x00 | |
| OP14 | C | F2 | 12-01-2017 19:25:10.800 | DISPLAY | WINDOW W3 | T3 |
| OP15 | C | F2 | 12-01-2017 19:25:12.500 | MOUSE | SCROLLING, MOVEMENT AMOUNT: 10 | |
| OP16 | C | F2 | 12-01-2017 19:25:13.790 | MOUSE | LEFT SINGLE CLICK | |
| OP17 | C | F2 | 12-01-2017 19:25:13.800 | STORAGE | ADDRESS: A00101 VALUE: 0x055 | |
| ⋮ | | | | | | |
| OP19 | B | F2 | 08-31-2016 21:50:40.000 | DISPLAY | WINDOW W1 | T4 |
| OP20 | B | F2 | 08-31-2016 21:50:41.000 | MOUSE | SCROLLING, MOVEMENT AMOUNT: 50 | |
| OP21 | B | F2 | 08-31-2016 21:50:42.200 | MOUSE | LEFT SINGLE CLICK | |
| OP22 | B | F2 | 08-31-2016 21:50:43.000 | KEYBOARD | KEYSTROKE COUNT: 8 | |
| OP23 | B | F2 | 08-31-2016 21:50:43.900 | MOUSE | SCROLLING, MOVEMENT AMOUNT: 60 | |
| OP24 | B | F2 | 08-31-2016 21:50:45.900 | MOUSE | LEFT SINGLE CLICK | |
| OP25 | B | F2 | 08-31-2016 21:50:46.000 | STORAGE | ADDRESS: A00100 VALUE: 0x033 | |
| ⋮ | | | | | | |

FIG.10

INDEX

| | OPERA-TION SUBJECT ID | FUNC-TION | OPERATION TIME (SECONDS) | INPUT COUNT (TIMES) | POINTER MOVEMENT AMOUNT (PIXEL COUNT) | INDEX |
|---|---|---|---|---|---|---|
| T1→ | A | F2 | 6.1 | 10 | 130 | 35.2 |
| T4→ | B | F2 | 6.0 | 10 | 110 | 33.0 |
| T3→ | C | F2 | 3.0 | 1 | 10 | 8.0 |

POWER CONSUMPTION TABLE

| | |
|---|---|
| POWER CONSUMPTION PER UNIT TIME | P1 |
| POWER CONSUMPTION PER KEYSTROKE | P2 |
| POWER CONSUMPTION PER UNIT DISTANCE OF POINTER MOVEMENT | P3 |
| POWER CONSUMPTION PER CLICK OF MOUSE | P4 |
| POWER CONSUMPTION PER UNIT ROTATION ANGLE OF WHEEL OF MOUSE | P5 |

# INFORMATION PROCESSOR, INFORMATION PROCESSING METHOD, AND NON-TRANSITORY STORAGE MEDIUM

CROSS-REFERENCE TO RELATED APPLICATIONS

This application is a Continuation of application Ser. No. 16/664,973, filed on Oct. 28, 2019, the contents of which are incorporated by reference herein in its entirety.

This application claims priority from Japanese Application No. 2018-205364, filed on Oct. 31, 2018, the contents of which are incorporated by reference herein in its entirety.

FIELD

The present application relates to an information processor, an information processing method, and a non-transitory storage medium.

BACKGROUND

In order to assist user operations of a device, for example, in Japanese Laid-open Patent Publication No. 2003-34587, it is disclosed that the user operations are monitored and, based on the monitored operation details, the most suitable operation assistance is provided to the user. In Japanese Laid-open Patent Publication No. 2003-34587, it is disclosed that, when an operation history of two users is similar, a function included in the operation history of one user but not included in the operation history of the other user is presented as an unknown function. Also in Japanese Laid-open Patent Publication No. 2003-34587, it is disclosed that the user with low frequency of use is provided with functions with high frequency of use in the operation history of the other user.

Regarding device operations performed by a user, a high efficiency may be required. In Japanese Laid-open Patent Publication No. 2003-34587, although it is disclosed that information for assisting the user operations is presented, giving assistance with an aim of improving the operation efficiency is not taken into account in the method disclosed therein. Hence, even if the information presented according to the method disclosed in Japanese Laid-open Patent Publication No. 2003-34587 is used, the efficiency of the user operations is not necessarily improved. For that reason, there is demand for improving the efficiency of the user operations of a device.

SUMMARY

An information processor, an information processing method, and a non-transitory storage medium are disclosed.

According to one aspect, there is provided an information processor comprising: an operation history obtaining unit configured to obtain operation histories created by user operations at a terminal device; a function identifying unit configured to, based on the obtained operation histories, identify a function performed by the user operations as an operation target function; an operation extracting unit configured to, based on information about the operation target function identified by the function identifying unit, extract predetermined operation histories from the obtained operation histories; an index calculating unit configured to calculate an index which indicates a level of efficiency of the operations for the operation histories extracted by the operation extracting unit; an operation selecting unit configured to, based on the index, select the operation histories having a predetermined efficiency; and an output controller configured to output a guide information based on the operation histories selected by the operation selecting unit.

According to one aspect, there is provided an information processing method comprising: obtaining operation histories created by user operations at a terminal device; identifying a function performed by the user operations as an operation target function based on the obtained operation histories; extracting predetermined operation histories from the obtained operation histories based on information about the operation target function identified by the function identifying unit; calculating an index which indicates a level of efficiency of the operations for the operation histories extracted by the operation extracting unit; selecting the operation histories having a predetermined efficiency based on the index; and outputting a guide information based on the operation histories selected at the selecting.

According to one aspect, there is provided a non-transitory computer readable storage medium that store a computer program for causing a computer to execute: obtaining operation histories created by user operations at a terminal device; identifying a function performed by the user operations as an operation target function based on the obtained operation histories; extracting predetermined operation histories from the obtained operation histories based on information about the operation target function identified by the function identifying unit; calculating an index which indicates a level of efficiency of the operations for the operation histories extracted by the operation extracting unit; selecting the operation histories having a predetermined efficiency based on the index; and outputting a guide information based on the operation histories selected at the selecting.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 7 is a diagram illustrating an example of a function address information table;

FIG. 8 is a diagram illustrating an example of an operation history table stored in the information processor;

FIG. 9 is a diagram illustrating an example of the operation history table in which information about functions has been added;

FIG. 10 is a diagram illustrating an example of the calculation result of indices;

DETAILED DESCRIPTION OF THE PREFERRED EMBODIMENTS

Exemplary embodiments of the present application are described below in detail with reference to the accompanying drawings. However, the present application is not limited by the embodiments described below.

First Embodiment

Figure 1:
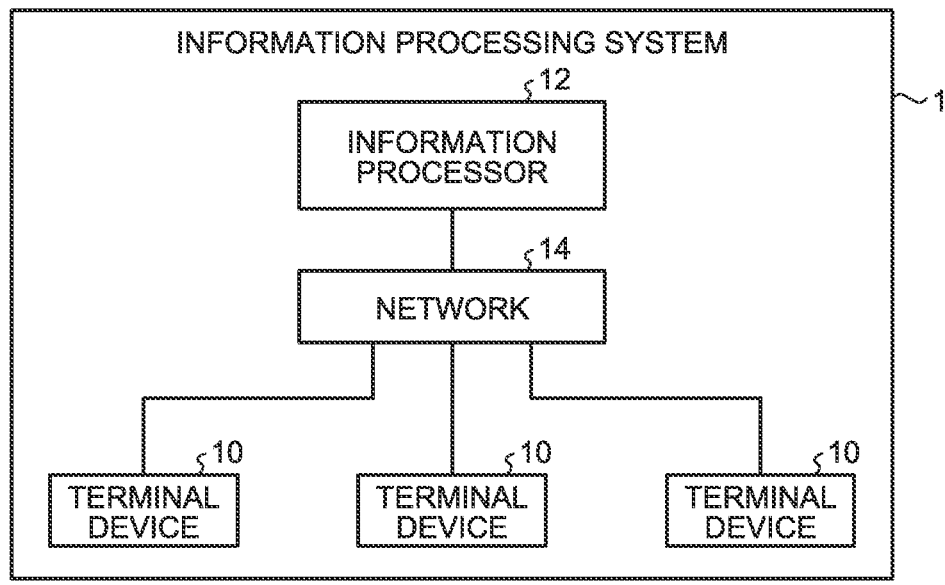
FIG. 1 is a block diagram of an information processing system according to a first embodiment.

FIG. 1 is a block diagram of an information processing system according to a first embodiment. As illustrated in FIG. 1, an information processing system 1 according to the first embodiment includes a plurality of terminal devices 10, an information processor 12 (an operation efficiency evaluation device) as a server, and a network 14. One or more terminal devices 10 and the information processor 12 are connected via the network 14, so that transmission and reception of information becomes possible via the network 14. Each terminal device 10 is capable of executing the same computer program. When the computer program is executed, the information about user operations of the concerned terminal device 10 is sent from the terminal device 10 to the information processor 12. The information processor 12 stores operation histories sent from each terminal device 10 and performs processing (described later) for analyzing the user operations from the perspective of efficiency to assist the user operations of the terminal device 10. Herein, the terminal devices 10 and the information processor 12 can be connected using wireless communication or wired communication. In the example illustrated in FIG. 1, although there are three terminal devices 10, the number of terminal devices 10 can be smaller or greater than three. For example, in the information processing system 1, there can be a single terminal device 10.

Terminal Device

Figure 2:
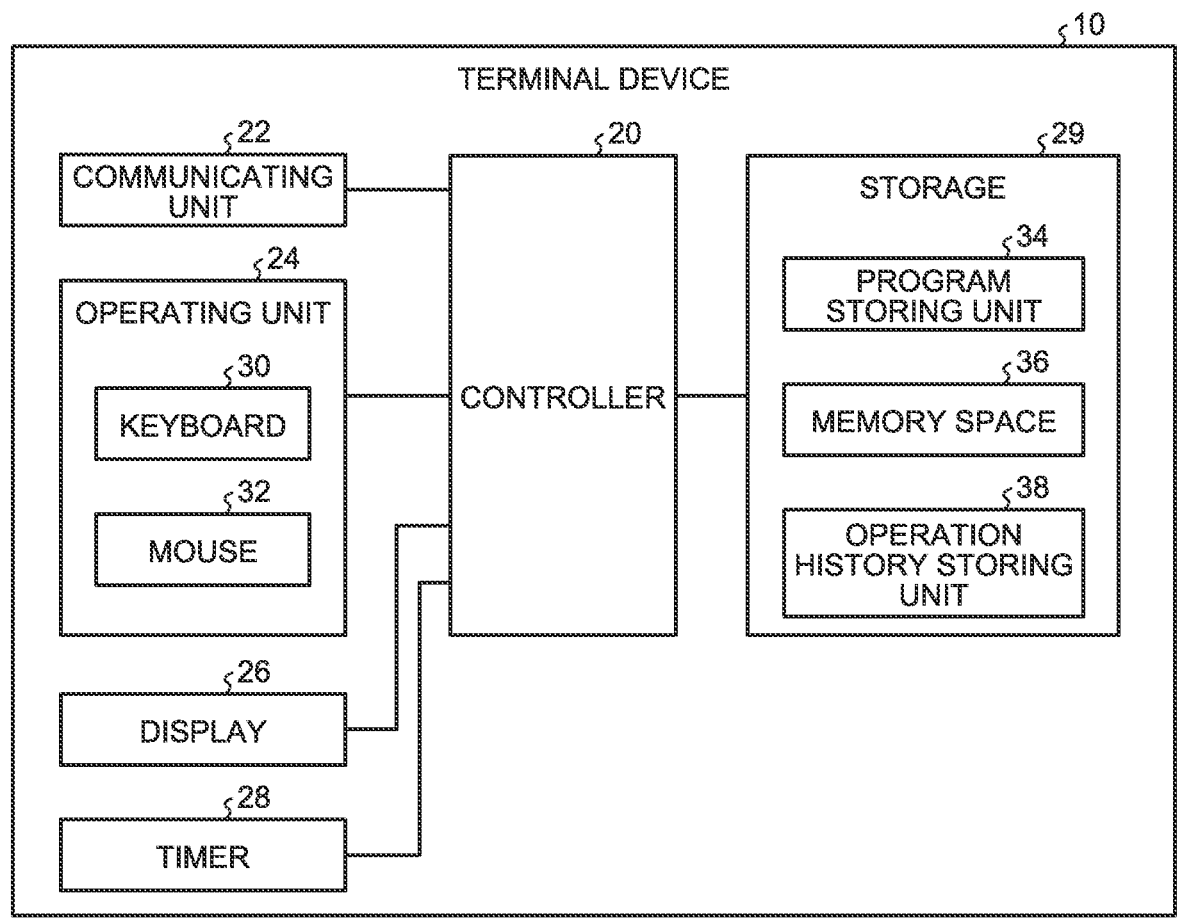
FIG. 2 is a block diagram of a terminal device according to the first embodiment.

FIG. 2 is a block diagram of the terminal device according to the first embodiment. The terminal device 10 is a computer and executes the computer programs. At the time of executing the computer program, the terminal device 10 obtains an operation history, which represents information about the user operations performed therein, and outputs the operation history to the information processor 12. In the first embodiment, the computer programs executed by the terminal device 10 are applications. However, that is not the only possible case. Alternatively, the computer program can be an operating system (OS) or firmware. As illustrated in FIG. 2, the terminal device 10 includes a controller 20, a communicating unit 22, an operating unit 24, a display 26, a timer unit 28, and a storage 29. The controller 20 is an arithmetic device, that is, a central processing unit (CPU) that controls the terminal device 10 in entirety.

The communicating unit 22 is a communication interface that is configured to communicate, under control of the controller 20, with other devices such as the information processor 12 for sending and receiving data. The operating unit 24 is an input unit for receiving operations (input) of the user. In the first embodiment, the operating unit 24 includes a keyboard 30 and a mouse 32. However, as long as the operating unit 24 is capable of receiving user operations, it is not necessary to use input devices such as the keyboard 30 and the mouse 32, and some other devices can alternatively be used. For example, the operating unit 24 can be a touch-sensitive panel. The display 26 is an output unit that outputs information under the control of the controller 20. Herein, the display 26 is a display for displaying information. Meanwhile, the terminal device 10 can also include some other output unit, other than the display 26, for outputting information. For example, the terminal device 10 can include a loudspeaker that outputs information in a form of sounds. The timer unit 28 is a device for obtaining a current time. Although the timer unit 28 autonomously calculates the current time, it can alternatively receive the time information from an external device.

The user operates the terminal device 10 in which the computer programs are running. In the following explanation, details of the user operations of the terminal device 10, that is, information about manner in which the user operates the operating unit 24 is referred to as operation details. Moreover, the operation details are also referred to as operation input information or an operation sequence. The controller 20 performs predetermined processing in response to the user operations. A result of the processing performed by the controller 20 in response to the user operations is referred to as an operation result. Moreover, the operation result is also referred to as operation output information. The operation result corresponds to the operation details and is stored in a memory space 36 of the storage 29 (described later). Herein, the user operates the operating unit 24 and makes the controller 20, which is executing the computer programs, perform predetermined processing. In the following explanation, types of processing performed with the user operations are referred to as a function F. That is, the function F represents a function provided to the user in response to the user operations. Thus, the function F can be said to be objective of the user operations. In order to make the computer program execute the function F, the user performs operations according to the operation details decided by himself or herself. The controller 20 reflects the result of the processing performed in response to the operation details (i.e., reflects the operation result) in a state of the computer programs. Thus, even if the same function F is to be executed, there are cases where the operation details (the operation sequence) differ according to the user. As an example, in a computer program for creating documents, the operations for setting a character font can be said to represent the function F. Then, the information indicating manner of operating the mouse 32 or the keyboard 30 for setting the font can be said to represent the operation details, and the information indicating the set font can be said to represent the operation result. An operation sequence for setting a predetermined font is not of only one type, and often a plurality of types of operation sequences is available. However, this explanation is only exemplary. Alternatively, for example, in a computer program for performing setting of a wireless communication device, operations for making predetermined functions of the wireless communication device available (i.e., active) can be said to represent the function F.

The storage 29 is used to store a variety of information. In the first embodiment, the storage 29 comprises a computer program storing unit 34, the memory space 36, and an operation history storing unit 38. The computer program storing unit 34 is used to store the computer programs to be executed at the terminal device 10. In the first embodiment, the computer program storing unit 34 is an external memory device. For example, the computer program storing unit 34 is a nonvolatile memory medium such as a hard disk drive (HDD) or a solid state drive (SSD). The controller 20 reads the computer programs from the computer program storing unit 34 and loads them.

The memory space 36 is composed of a memory that is directly accessible by the controller 20, that is, an internal memory device. For example, the memory space 36 is composed of a semiconductor memory. The memory space 36 can also be called an address space. In the memory space 36, at least one memory area is assigned for each function F. Information regarding each function F is written in a rewritable manner in the corresponding assigned memory area. For example, a operation result for a particular function F is written in a rewritable manner in the memory area assigned to that function F. That is, the controller 20 executes the function F in the computer program by accessing the memory space 36, performing processing based on the information stored in the memory space 36, and storing the processing result in the memory space 36. Moreover, the processing details for the function F can be also stored in the assigned memory areas for the function F.

Figures 3, 4:
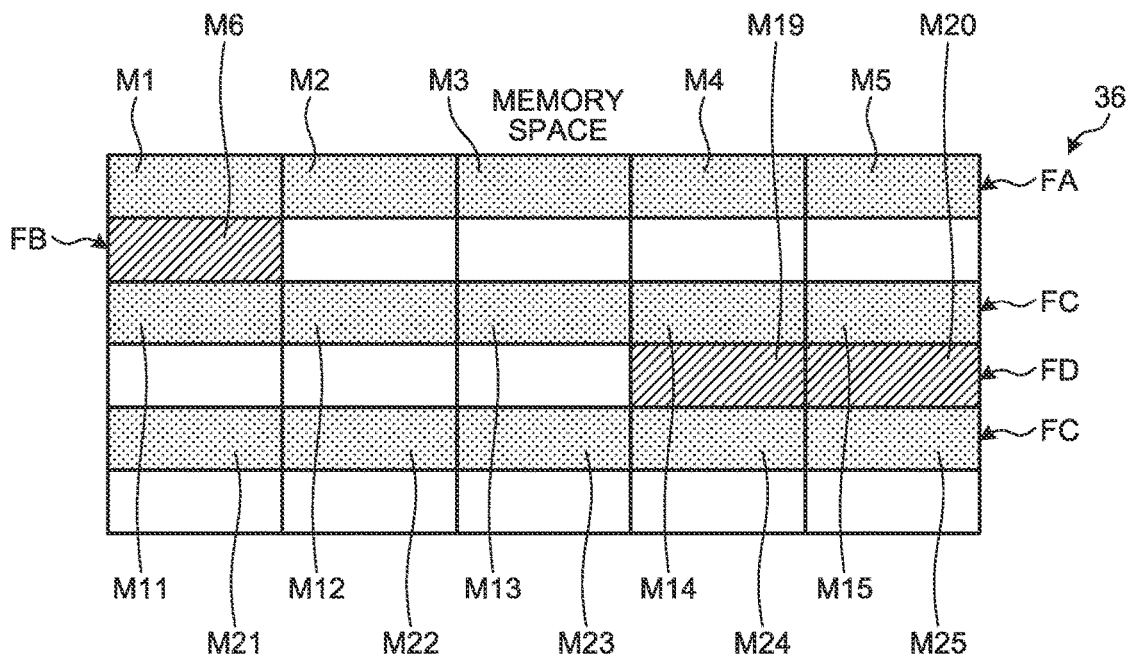
FIG. 3 is a schematic conceptual diagram illustrating a memory space according to the first embodiment.
FIG. 4 is a diagram illustrating an example of an operation history table stored in the terminal device.

FIG. 3 is a schematic conceptual diagram illustrating the memory space according to the first embodiment. In FIG. 3 is illustrated an example in which the memory space 36 includes a plurality of memory areas M having mutually different addresses. In the example illustrated in FIG. 3, the memory areas M include a memory area M1 to a memory area M25. Moreover, in the example illustrated in FIG. 3, the memory areas from the memory area M1 to the memory area M5 are assigned to a function FA representing one of the functions F. Thus, the operation result for the function FA is stored in at least one of the memory areas from the memory area M1 to the memory area M5. Furthermore, in the example illustrated in FIG. 3, the memory area M6 is assigned to a function FB, the memory areas including the memory areas M11 to M15 and the memory areas M21 to M25 are assigned to a function FC, and the memory areas M19 and M20 are assigned to a function FD. In this way, in the memory space 36, the addresses of the memory areas to be used by the functions F are determined in advance. In other words, in the memory space 36 that is used during the execution of the computer programs by the controller 20, predetermined addresses correspond to predetermined functions. However, the correspondence relationship among the functions F and the memory areas M as illustrated in FIG. 3 is only exemplary. That is, as long as the memory areas M corresponding to the functions F are fixed, the number of memory areas M, the size of the memory areas, and the addresses of the memory areas M, which are assigned to a single function F, can be arbitrarily set.

Returning to the explanation with reference to FIG. 2, the operation history storing unit 38 is a memory used to store the operation history representing the history of the user operations of the terminal device 10. The operation history includes the operation details (the operation input information) and the operation result (the operation output information). The controller 20 detects the details of the user operations of the operating unit 24, that is, the operation details. Then the controller 20 stores the detected operation details in the operation history storing unit 38. Moreover, the controller 20 detects changes in the memory areas M and, on detecting any change, stores information about the memory areas M (information about the operation result) in the operation history storing unit 38. The information about the operation result stored in the operation history storing unit 38 includes the addresses of the memory areas M in which the operation result is stored and values of those addresses (values representing the operation result). Meanwhile, the operation history storing unit 38 can be configured as integrated hardware with, for example, the computer program storing unit 34 that is an external memory device, or can be configured as a separate memory device from the computer program storing unit 34.

FIG. 4 is a diagram illustrating an example of an operation history table stored in the terminal device. For example, the controller 20 stores the operation history in the operation history table held in the operation history storing unit 38. Herein, the details of the operation history table as illustrated in FIG. 4 are only exemplary. As illustrated in FIG. 4, the operation history table is used to store operation times, operation targets, and operation details or operation result in a corresponding manner. The operation time represents a time related to an operation. For example, an operation time is a time at which a single operation was started, or a time at which a single operation was ended, or a time at which the operation result was stored. As illustrated in FIG. 4, the operation time can be in a form of a "date and time" by combining a date and a time. In the first embodiment, the term "time" is used even when implying the "date and time". The operation target represents a device related to the concerned operation. The operation history includes the history of a plurality of operations. In the following explanation, in order to explicitly specify that a single operation history corresponds to a single operation, a term OP is used as a unit operation history OP. The unit operation history represents the history of a single operation detail or a single operation result. In the operation history table, an identifier (for example, a reference symbol such as OP1) for enabling identification of the concerned operation history (the unit operation history OP) may or may not be stored in a corresponding manner to the operation details.

In the example illustrated in FIG. 4, a unit operation history OP1 represents the operation details for displaying a window W1 in the display 26. The unit operation history OP1 essentially includes an operation for opening the window W1 to make the controller 20 control the display 26 in advance. In FIG. 4, the operation history earlier than the unit operation history OP1 is not illustrated. Thus, the unit operation history OP1 can be said to represent the operation history when the user performs the operation details for displaying the window W1 with the display 26 as the operation target. Moreover, a unit operation history OP2 represents the operation details performed just after the unit operation history OP1, and indicates the operation in which the mouse 32 is the operation target and the user scrolls the mouse 32 with a movement amount of 80 (i.e., the operation in which a pointer displayed in the display 26 is moved by the movement amount of 80). Herein, the movement amount of 80 implies that, for example, the mouse is scrolled over 80 pixels of the display 26. However, that is not the only possible case. Alternatively, for example, a movement distance of the mouse 32 on the screen can be expressed as a numerical value in centimeters or inches. Alternatively, the movement distance of the mouse 32 on the desk can be expressed as a numerical value in centimeters or inches. That is, any arbitrary scale can be used for indicating the movement amount of the mouse 32. Furthermore, a unit operation history OP3 represents the operation details performed just after the unit operation history OP2, and indicates the operation in which a left button of the mouse 32 is clicked once by the user, that is, indicates a left single click of the mouse 32 by the user. Moreover, a unit operation history OP4 represents the operation details performed just after the unit operation history OP3, and indicates the operation in which the user hits the keyboard 30 for eight times (keystroke count of eight). Meanwhile, although not illustrated in FIG. 4, a name of the key that is hit in the keyboard 30 (i.e., the information about which keys of the keyboard 30 are pressed) can also be recorded in the operation history table. Furthermore, a unit operation history OP5 represents the operation details performed just after the unit operation history OP4, and indicates the operation in which the user scrolls the mouse 32 by the movement amount of 50. Moreover, a unit operation history OP6 represents the operation details performed just after the unit operation history OP5, and indicates the operation in which the user performs the left single click of the mouse 32. Furthermore, a unit operation history OP7 represents the information about the operation result stored in the memory space 36 just after the unit operation history OP6, and indicates the information about the operation result decided by the controller 20 according to the operation details of the unit operation histories from the unit operation history OP1 to the unit operation history OP6. When the operation result is recorded, the operation target field of the operation history table is "storage". The unit operation history OP7 indicates that the memory area M in which the operation result is stored has an address A00100, and that the value indicating the operation result stored at that address is 0x55. For example, the address A00100 corresponds to the memory area M1 illustrated in FIG. 3.

In this way, the controller 20 executes the control program based on the user operation details, and stores the operation result in the memory space 36. Then, the controller 20 stores, as the operation history in the operation history storing unit 38, the information about the operation details and the information about the operation result. The controller 20 associates, to the operation history, identification (ID) information indicating the user or the terminal device 10 to which the operation history is attributed, and sends the operation history and the ID information to the information processor 12 via the communicating unit 22. Herein, the ID information can be an ID of the user (i.e., the user ID), or can be an ID of the terminal device 10 (i.e., the terminal ID). For example, in an environment in which there is only one terminal device 10 with reference to FIG. 1 and a plurality of users alternately log in to the terminal device 10 and use the computer programs, the user IDs are used. Alternatively, for example, in an environment in which the terminal devices 10 are cellular phones or smartphones and each terminal device 10 is restricted to be used by a single user, the terminal IDs can be used. Since the user IDs as well as the terminal IDs are IDs indicating the subjects related to the operations (i.e., operation subjects), they are collectively referred to as "operation subject IDs" or "operation subject identifiers". Meanwhile, the operation history may be sent to the information processor 12 at a timing at which a new unit operation history OP is added or at a timing at which a unit operation history OP is updated, due to a change in the data (value) of the memory areas M of predetermined addresses. Otherwise the operation history may be sent to the information processor 12 at a predetermined time interval.

Figure 5:
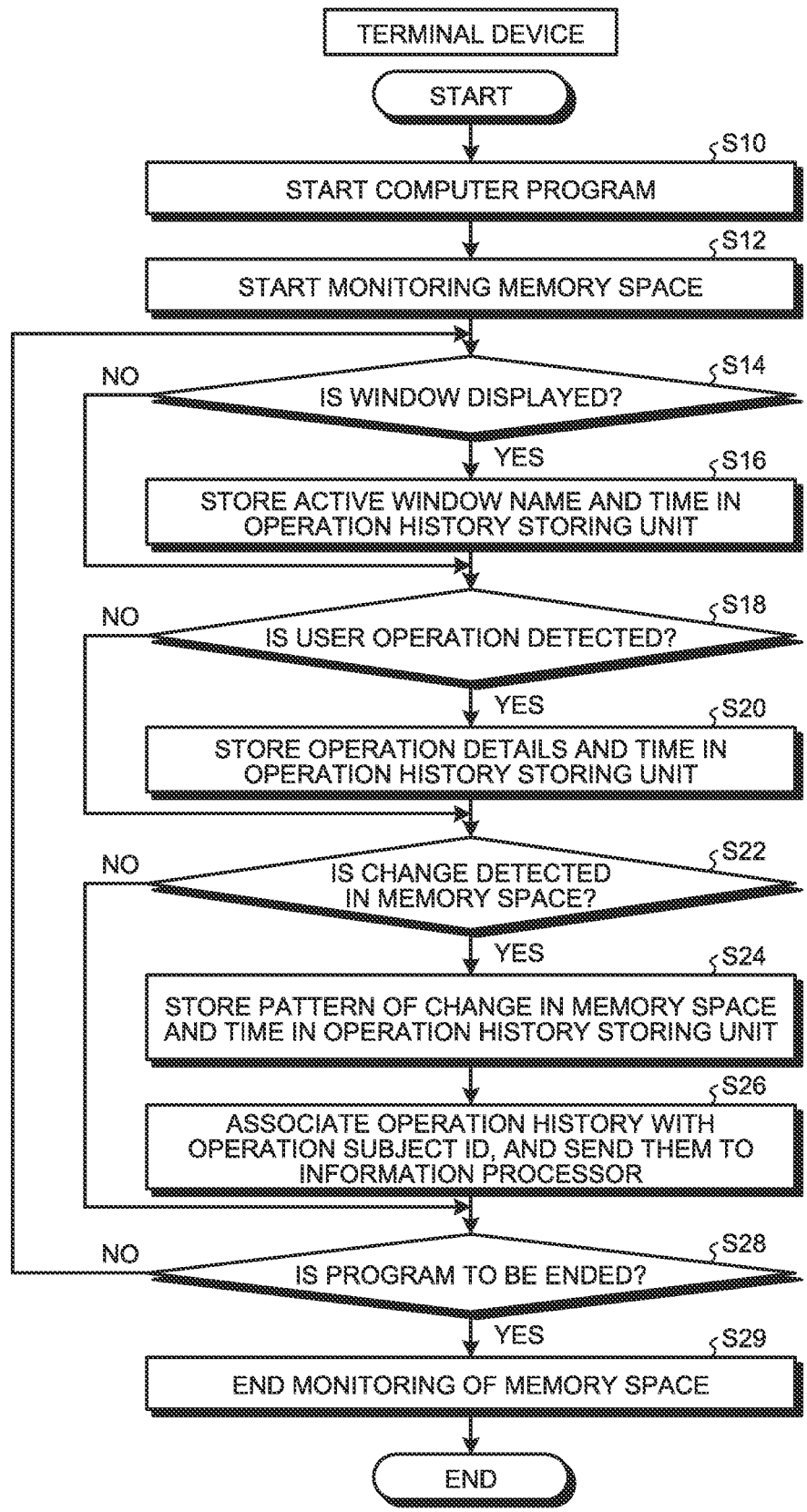
FIG. 5 is a flowchart for explaining a flow of processes performed at the terminal device according to the first embodiment.

The terminal device 10 has the configuration as described above. Given below is an explanation of a flowchart of a flow of processes by which the terminal device 10 obtains the operation history. FIG. 5 is a flowchart for explaining a flow of processes performed at the terminal device according to the first embodiment. As illustrated in FIG. 5, when a predetermined user operation with respect to the operating unit 24 (an operation for booting a computer program) is detected, the controller 20 starts the computer program (Step S10). Once the computer program is started, the controller 20 starts monitoring the memory space 36 (Step S12). More particularly, the controller 20 monitors whether or not there is any change in values of the memory areas M that have specific addresses assigned in the memory space 36. Herein, the memory areas M assigned with specific addresses imply the memory areas M having the addresses to which the functions F of the computer program are assigned. Then, the controller 20 executes the computer program and determines whether or not a window is displayed in the display 26 (Step S14). Herein, the window is opened to enable operations and is also called an "active window". When the window is not displayed (No at Step S14), then the system control proceeds to Step S18 (described later). When the window is displayed (Yes at Step S14), then the controller 20 stores, as the unit operation history OP in the operation history storing unit 38, a name of the active window, that is, a name of the window that is being displayed and that is the target for user operations, and a time of displaying the window read from the timer unit 28 (Step S16).

Then, the controller 20 detects whether or not the user performed an operation with respect to the operating unit 24 (Step S18). When the user operation is not detected (No at Step S18), then the system control proceeds to Step S22 (described later). When the user operation is detected (Yes at Step S18), the controller 20 stores, as the unit operation history OP in the operation history storing unit 38, the user operation details and the time of performing the operation read from the timer unit 28 (Step S20). Subsequently, the controller 20 determines whether a change is detected in the memory space 36 corresponding to the function F (Step S22). That is, the controller 20 determines whether there is a change in the values (data) of the memory areas M of the specific addresses that were being monitored and that correspond to the function F (Step S22). When there is no change in the memory space 36 (No at Step S22), then the system control proceeds to Step S28 (described later). When there is a change in the memory space 36 (Yes at Step S22), then the controller 20 stores, as the unit operation history OP in the operation history storing unit 38, a pattern of the change in the memory space 36, that is, the information about the operation result, and the time of the change in the memory space 36 read from the timer unit 28 (Step S24). That is, when there is a change in the values of the memory areas M of the specific addresses, the controller 20 stores, as the unit operation history OP in the operation history storing unit 38, the addresses of the memory areas M and the post-change values of the memory areas, and the time of the change in the memory areas M. Regarding the pattern of the change in the memory space 36 (i.e., regarding the information about the operation result), when one operation causes multiple changes in a plurality of memory areas M, the concerned addresses and the values of the addresses can be recorded as a single set of data, or can be recorded separately as multiple sets of data for each addresses as the unit operation histories OP. Alternatively, instead of using the post-change values of the memory areas, the controller 20 can store, as the unit operation history OP indicating the operation result, the pre-change values of the memory areas and the differences among the pre-change values and the post-change values.

Subsequently, the controller 20 associates an operation subject ID (a user ID or a terminal ID), which enables identification of the operation-related subject, to each of the unit operation histories OP (Step S26), and send them to the information processor 12. Then, the controller 20 determines whether or not to end the computer program (Step S28). When it is determined not to end the computer program (No at Step S28), the system control returns to Step S14 and the controller 20 again performs the operations. When it is determined to end the computer program (Yes at Step S28), the controller 20 ends the monitoring of the memory space 36 (Step S29) to end the present process. Meanwhile, the operations explained with reference to FIG. 5 can be performed with respect to some other computer programs other than the booted computer program, that is, can be performed with respect to a monitor program and an operation monitoring program, or can be performed with respect to the booted computer program itself.

Information Processor

Figure 6:
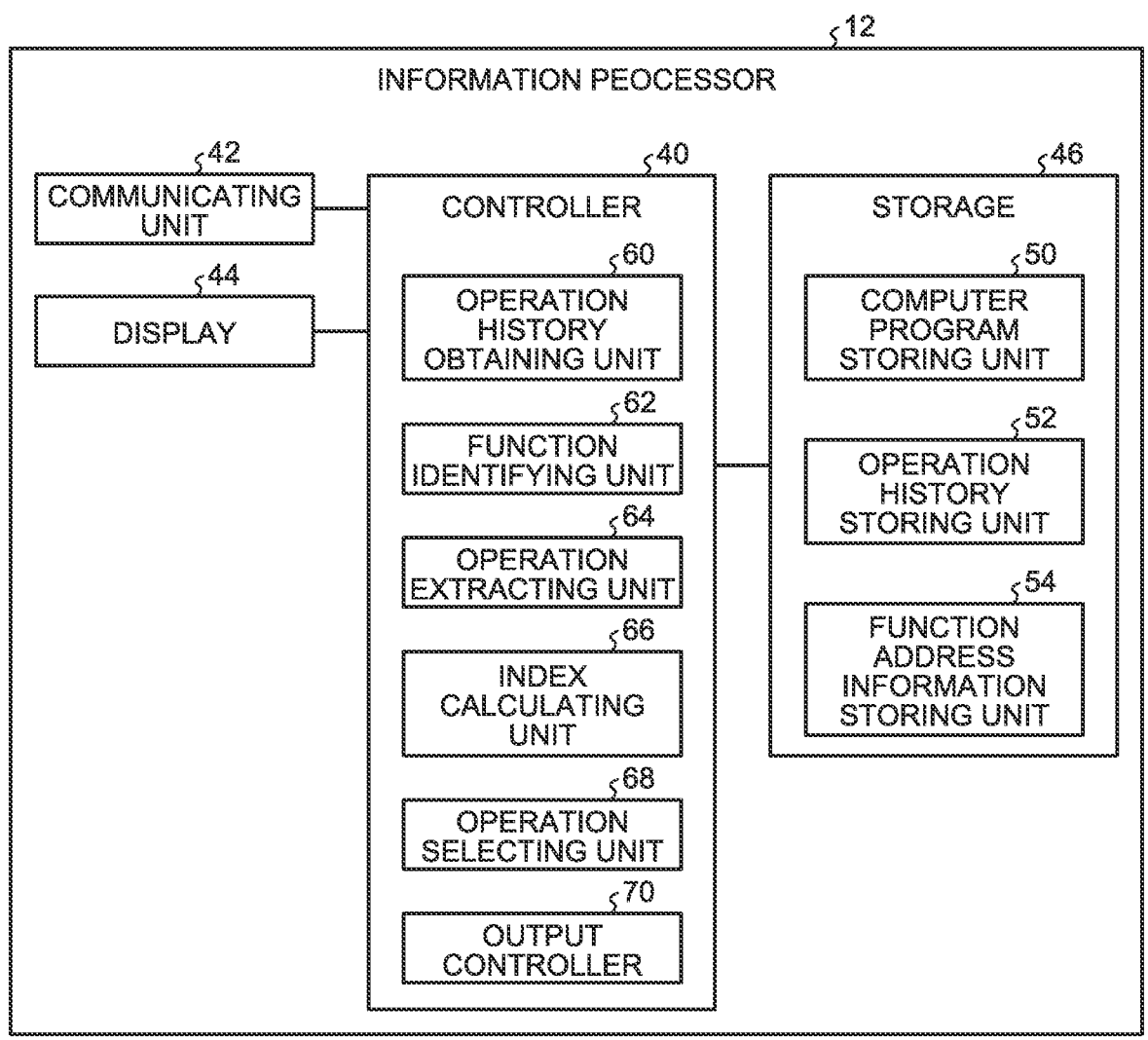
FIG. 6 is a block diagram of an information processor according to the first embodiment.

Given below is an explanation about the information processor 12. FIG. 6 is a block diagram of the information processor 12 according to the first embodiment. The information processor 12 is composed of a computer as a server. Alternatively, the information processor 12 can be composed of a plurality of computers. In that case, the functions can be dispersed among the computers so that some of the functional blocks illustrated in FIG. 6 are processed by a particular computer and the other function blocks are processed by other computers. Alternatively, a dispersion operation by which the same functional block is processed by a plurality of computers can be performed. The information processor 12 receives the operation histories from the terminal devices 10 and evaluates an efficiency of each of the operations performed by the users. In the first embodiment, the information processor 12 and the terminal devices 10 are configured to be separated devices. However, alternatively, each terminal device 10 can be configured to include the information processor 12. In other words, the terminal device 10 and the information processor 12 can represent the same device. That is, the information processor 12 can execute a computer program in which the user performs operations, store the operation history of the user, obtain the operation histories from other devices (other terminal devices 10), and perform a processing (described later) for evaluating an efficiency of the user operations. Meanwhile, the terminal device 10 can alternatively be configured to obtain the operation histories from the other terminal devices 10 and evaluate the efficiency of the user operations.

As illustrated in FIG. 6, the information processor 12 includes a controller 40, a communicating unit 42, a display 44, and a storage 46. The controller 40 is an arithmetic device, that is, a central processing unit (CPU) that controls the information processor 12 in entirety. Regarding the controller 40, the detailed explanation is given later.

The communication unit 42 is a communication interface that is configured to communicate, under control of the controller 40, with other devices such as the terminal devices 10 for sending and receiving data. The display 44 is an output unit that outputs information under the control of the controller 40. Herein, the display 44 is a display for displaying information. Meanwhile, the information processor 12 can also include some other output unit, other than the display 44, for outputting information. For example, the information processor 12 can include a loudspeaker that outputs information in a form of sounds. Meanwhile, the information processor 12 can also include an operating unit identical to that provided in the terminal device 10. Moreover, the display 44 may not be provided, and the information from the information processor 12 can be output to some other device other than the information processor 12 (i.e., to a display device or a display of another computer).

The storage 46 is used to store a variety of information. In the first embodiment, the storage 46 includes a computer program storing unit 50, an operation history storing unit 52, and a function address information storing unit 54. The computer program storing unit 50 is used to store the computer programs to be executed in the information processor 12. Herein, the computer programs executed in the information processor 12 imply computer programs for obtaining the operation history from the terminal devices 10 and performing a variety of processing. In the first embodiment, the computer program storing unit 50 is an external memory device, such as a nonvolatile recording medium represented by an HDD or an SSD.

The operation history storing unit 52 is used to store the operation histories sent from the terminal devices 10. The operation history storing unit 52 can be configured as integrated hardware with, for example, the computer program storing unit 50 that is an external memory device, or can be configured as a separate memory device from the computer program storing unit 50.

The function address information storing unit 54 is used to store function address information. Herein, the function address information implies the information indicating a correspondence relationship of the functions F of the computer program in each terminal device 10 with the addresses (the memory areas M) in the memory space of the terminal device 10. More particularly, the function address information storing unit 54 is used to store a function address information table. FIG. 7 is a diagram illustrating an example of the function address information table. As illustrated in FIG. 7, the function address information table is used to store start addresses, end addresses, and functions (the functions F) in a corresponding manner. In the example illustrated in FIG. 7, in a computer program of the terminal device 10, a function F1 is assigned with addresses from an address A00000 to an address A000FF in the memory space in the memory space 36, a function F2 is assigned with addresses from an address A00100 to an address A0011F in the memory space in the memory space 36, a function F3 is assigned with addresses from an address A00200 to an address A003FF in the memory space in the memory space 36, a function F4 is assigned with addresses from an address A00400 to an address A004FF and from an address A00600 to an address A006FF in the memory space in the memory space 36, and a function F5 is assigned with addresses from an address A00500 to an address A0057F. Such function address information is stored in advance in the function address information storing unit 54. Meanwhile, the function address information storing unit 54 can be configured as integrated hardware with, for example, the computer program storing unit 50 that is an external memory device, or can be configured as a separate memory device from the computer program storing unit 50.

Returning to the explanation of the information processor 12 with reference to FIG. 6, the controller 40 includes an operation history obtaining unit 60, a function identifying unit 62, an operation extracting unit 64, an index calculating unit 66, an operation selecting unit 68, and an output controller 70. The operation history obtaining unit 60, the function identifying unit 62, the operation extracting unit 64, the index calculating unit 66, the operation selecting unit 68, and the output controller 70 are realized when the controller 40 reads the computer program from the computer program storing unit 50, and performs the respective processing.

The operation history obtaining unit 60 obtains, from the terminal device 10 via the communication unit 42, the operation history that is stored in the operation history storing unit 38 of the terminal devices 10. The operation history obtaining unit 60 obtains the operation history, which is created in response to the user operations, from each of a plurality of terminal devices 10. That is, the operation history obtaining unit 60 obtains the following information as the operation history: the operation details; the information about the operation result (the addresses of the memory areas M in which the operation result is stored and the values stored at those addresses); the information about the operation time; and the information about the operation subject ID indicating the user or the terminal device 10 related to the operation in the operation history. Then, the operation history obtaining unit 60 stores the obtained operation history in the operation history storing unit 52.

FIG. 8 is a diagram illustrating an example of an operation history table stored in the information processor 12. For example, the operation history obtaining unit 60 stores the obtained operation history in the form of the operation history table, which is illustrated in FIG. 8, in the operation history storing unit 52. As illustrated in FIG. 8, the operation history table includes the following fields (items): operation subject ID (ID information); operation time; operation target; and operation details or operation result. The operation history table stores, as the operation history, these fields in a corresponding manner for each of the unit operation histories OP. For example, regarding the unit operation history OP1 to the unit operation history OP7 stored in the terminal device 10 as illustrated in FIG. 4, the operation subject ID is added to be stored in FIG. 8. The unit operation histories OP1 to OP7 include an operation subject ID "A" indicating a user A who performed the operations. Moreover, in the example illustrated in FIG. 8, the unit operation histories OP8 and OP9 are illustrated that are created by the user A after the creation of the operation histories illustrated in FIG. 4. Moreover, the unit operation histories OP10 to OP13 of a user B are also illustrated. In the example illustrated in FIG. 8, the unit operation history OP8 represents the operation details performed just after the unit operation history OP7, and indicates the operation in which the user A scrolls the mouse 32 by the movement amount of 60. The unit operation history OP9 represents the operation details performed just after the unit operation history OP8, and indicates the operation in which the user A performs the left single click of the mouse 32. The unit operation history OP10 represents the operation details performed by the user B who is different from the user A, and indicates the operation in which a window W2 is displayed in the display 26. The unit operation history OP11 represents the operation details performed just after the unit operation history OP10, and indicates the operation in which the user B scrolls the mouse 32 by the movement amount of 50. The unit operation history OP12 represents the operation details performed just after the unit operation history OP11, and indicates the operation in which the user B performs the left single click of the mouse 32. The unit operation history OP13 represents the information about the operation result stored in the memory space 36 just after the unit operation history OP12, and indicates the information of the operation result decided by the controller 20 based on the operation details of the unit operation histories from the unit operation history OP10 to the unit operation history OP12. The unit operation history OP13 indicates that the memory area M in which the operation result is stored has an address A00500, and that the value indicating the operation result stored at that address is 0x00. Meanwhile, regarding the operation history table in the information processor 12, an identifier (for example, a reference symbol such as OP1) for enabling identification of the concerned operation history (the unit operation history OP) may or may not be stored in a corresponding manner to the operation details.

Returning to the explanation of the information processor 12 with reference to FIG. 6, the function identifying unit 62 groups the operation histories, which are obtained by the operation history obtaining unit 60, to create operation history groups, and identifies the function F for each of the operation history groups. In other words, regarding each of the unit operation histories OP, the function identifying unit 62 determines whether or not to associate it with an operation history group. Then, regarding each of the unit operation histories OP which is to be associated with an operation history group, the function identifying unit 62 associates it with one of the operation history groups to identify the function F for each of the operation history groups. For example, the function identifying unit 62 specifies a plurality of the unit operation histories OP as a single operation history group. A single operation history group can be said to represent a history of a series of the user operations performed to achieve a single objective operation (function F). That is, it can be said that the function identifying unit 62 forms the operation history group by grouping a series of the unit operation histories OP, and accordingly identifies the function F corresponding to the operation details input by the user. Meanwhile, the term "operation history" sometimes implies one or more of the unit operation history OP, and sometimes implies one or more of the operation history groups.

The function identifying unit 62 creates an operation history group such that the operation history group includes the unit operation history OP of at least a single operation details and the unit operation history OP of a single operation result. That is, the function identifying unit 62 specifies, as a single operation history group, the unit operation history OP of a single operation result and the unit operation history OP of the operation details corresponding to the unit operation history OP of the operation result. The function identifying unit 62 specifies, as a single operation history group, the unit operation history OP of the operation result and the unit operation history OP of the operation details associated with the previous time to the time of the unit operation history OP of the operation result. More particularly, the function identifying unit 62 brings together, in a single operation history group, the unit operation histories OP starting from a state in which the user becomes able to perform operations to a state in which the operation result is decided in response to the operations. Typically, the state in which the user becomes able to perform operations implies a state in which a window for enabling the user to perform operations (i.e., an active window) is displayed. More specifically, the function identifying unit 62 identifies one unit operation history OP in which the operation result is included, that is, one unit operation history OP in which a change in the values of the memory areas M is detected, among the unit operation histories OP with the same operation subject ID. Then the function identifying unit 62 identifies another unit operation history OP in which a window is displayed just before the one unit operation history OP identified, by tracing back the time from the identified unit operation history OP. Then the function identifying unit 62 treats the one unit operation history OP identified, the another unit operation history OP identified, and other unit operation history/histories OP included therebetween as a single operation history group (a group of the operation histories). In other words, the function identifying unit 62 specifies the unit operation history OP in which the change in the values of the memory areas M is detected as the last data included in a single operation history group. Then, the function identifying unit 62 identifies the initial data by tracing back the time from the unit operation history OP of the last data. The unit operation history OP of the initial data corresponds to a unit operation history OP in which a window is displayed at the closest time (the most recent time) to the last data among the unit operation histories OP which has the same operation subject ID as that of the unit operation history OP of the last data.

In the example illustrated in FIG. 8, the function identifying unit 62 treats the unit operation history OP7, which indicates a change in the values of the memory areas M, as the last data, and treats the unit operation history OP1, which indicates an operation of displaying a window before the unit operation history OP7 and have the same operation subject ID as that of the unit operation history OP7, as the initial data. The function identifying unit 62 treats the unit operation histories from the unit operation history OP1 to the unit operation history OP7 as a single operation history group T1 by the user A. Moreover, the function identifying unit 62 treats the unit operation histories from the unit operation history OP10 to the unit operation history OP13 as a single operation history group T2 by the user B. Meanwhile, in the example illustrated in FIG. 8, the unit operation history OP8 and the unit operation history OP9 do not correspond to any operation history group. Regarding each of the unit operation histories OP, the function identifying unit 62 determines whether or not the unit operation history OP corresponds to an operation from the display of a window to a change of the values of the memory areas M. Then, the unit operation history OP not matching with this condition is determined not to correspond to any operation history group. The unit operation histories OP8 and OP9 do not match with the condition, and are thus determined not to correspond to any operation history group.

After the operation history groups are created by grouping the unit operation histories OP, the function identifying unit 62 identifies the function F for each of the operation history groups. Since the identified function F is performed as a result of the user operations, they are also called "operation target function" or "operation objective function". An operation history group represents a collection of a series of the operations performed by the user in order to achieve a particular single objective. Thus, from the user perspective, a single operation history group can be said to be a single user operation (i.e., operations performed at once). Hence, it can be said that the function identifying unit 62 identifies a function F as the operation target function for each of the user operations. More particularly, the function identifying unit 62 identifies the unit operation history OP included in the same operation history group as the same function F. The function identifying unit 62 identifies the function F for each of the operation history group based on the information in the memory space 36 in which the operation result is stored in the operation history. In the operation history obtained by the operation history obtaining unit 60, the information about the function F corresponding to the unit operation history OP is not included. In contrast, based on the information about the memory space 36 in which the operation result is stored, the function identifying unit 62 identifies the function F for each of the user operations, or herein for each of the operation groups. More particularly, from the operation history which is included in the operation history group and in which the value of the memory area M is changed, the function identifying unit 62 extracts the address of the memory area M in which the operation result is stored. In FIG. 8, the unit operation history OP7 and the unit operation history OP13 correspond to the unit operation history in which the value of the memory area M is changed. Then, the function identifying unit 62 reads, from the function address information storing unit 54, the function address information indicating a relationship between the addresses of the memory space 36 and the function F, and collates the function address information with the extracted address of the memory area M (i.e., the address of the memory area M stored in the operation result). The function identifying unit 62 identifies, in the function address information, that the function F associated with the same address as the address of the extracted memory area M is the function F of the concerned operation history group. The function identifying unit 62 identifies the function F for each of the operation history groups. Then, the function identifying unit 62 stores the information about the identified function F in a corresponding manner to the operation history in the operation history storing unit 52. In this way, the function identifying unit 62 identifies the function F corresponding to the addresses of the memory space 36 in the function address information as the objective function F of the concerned operations. Then, the function identifying unit 62 assigns the information about the identified function F to the operation history group obtained by the operation history obtaining unit 60.

Meanwhile, the function address information can alternatively be stored in the terminal device 10. In that case, the controller 20 of the terminal device 10 adds, to the operation history, the information about the function F created based on the function address information according to the method described above, and stores the operation history in the operation history storing unit 38. Thus, in that case, the information processor 12 obtains the operation history that includes the information about the function F, and the function identifying unit 62 obtains the information about the function F (the operation target function) included in the operation history and identifies the function by the user operation. That is, the function identifying unit 62 can identify the operation target function by obtaining the information created by the terminal device 10. Thus, the function identifying unit 62 can be said to be a function obtaining unit or an operation target function obtaining unit.

Explained below with reference to FIGS. 7 and 8 is a specific example of the operation for identifying a function. In the example illustrated in the operation history table in FIG. 8, the unit operation history OP7 has the address A00100 assigned thereto. Thus, according to the function address information illustrated in FIG. 7, the operation history group including the unit operation history OP1 to the unit operation history OP7 corresponds to the function F2. Moreover, the unit operation history OP13 has the address A00500 assigned thereto. Thus, according to the function address information illustrated in FIG. 7, the operation history group including the unit operation history OP10 to the unit operation history OP13 corresponds to the function F5. The function identifying unit 62 adds the identified functions in the operation history table illustrated in FIG. 8, and stores them in the operation history storing unit 52. FIG. 9 is a diagram illustrating an example of the operation history table in which the information about the functions F has been added. As compared to the operation history table illustrated in FIG. 8, a "function" field is added in the operation history table illustrated in FIG. 9. As illustrated in FIG. 9, the function identifying unit 62 associates information of the function F2 to the unit operation histories OP1 to OP7, and associates information of the function F5 to the unit operation histories OP10 to OP13. Moreover, regarding the unit operation histories OP8 and OP9 that are not classified into any operation history group, a "-" is written in the "function" column indicating that no function F is associated therewith.

Meanwhile, in the operation history table, in addition to the operation history for which the functions F are identified in a single processing, the operation history for which the functions F were identified in the past is also stored. In the example illustrated in FIG. 9, an operation history group T3 which includes the unit operation histories OP14 to OP17 by a user C, and an operation history group T4 which includes the unit operation histories OP19 to OP25 by the user B are such operation history groups. The unit operation history OP14 indicates the operation details of displaying the window W3 in the display 26. The unit operation history OP15 and the unit operation history OP16, although the explanations thereof are omitted, represent the operation histories including the operation details by the user C. The unit operation history OP17 represents the information about the operation result decided by the controller 20 according to the operation details of the unit operation histories OP14 to OP16. The unit operation history OP17 indicates that the memory area M in which the operation result is stored has the address A00101 and that the value indicating the operation result stored at that address is 0x55. Thus, the unit operation histories OP14 to OP17 have the function F2 corresponding thereto. The unit operation history OP19 represents the operation details of displaying the window W1 in the display 26. The unit operation histories OP20 to OP24, although the explanations thereof are omitted, represent the operation history including the operation details by the user B. Moreover, unit operation history OP25 represents information about the operation result decided by the controller 20 according to the operation details of the unit operation histories OP19 to OP24. The unit operation history OP25 indicates that the memory area M in which the operation result is stored has the address A00100 and that the value the operation result stored at that address is 0x33. Thus, the unit operation histories OP19 to OP25 have the function F2 corresponding thereto. Meanwhile, the operation history table can be used to store the entire operation history obtained in the past, or can be used to store the operation history obtained only during a predetermined period of time (for example, the previous one year), or can be used to store only such operation history which has the operation time within a predetermined period of time.

Returning to the explanation of the information processor 12 with reference to FIG. 6, the operation extracting unit 64 extracts the operation history groups that can be considered to represent the operations for the same objective. For example, the operations corresponding to the same function F can be considered to the operations for the same objective. Hence, the operation extracting unit 64 extracts those operations. More particularly, from among the operation history groups included in the operation history table, the operation history groups matching with one of the following conditions (1) to (4) are extracted as the operations for the same objective.

(1) The operation history groups having a first predetermined value (for example, the function F2) in the function field;

(2) The operation history groups having a first predetermined value (for example, the function F2) in the function field, and having a second predetermined value (for example, A00100) as the address of the operation result;

(3) The operation history groups having a first predetermined value (for example, the function F2) in the function field, and having a second predetermined value (for example, A00100) as the address of the operation result, and having a third predetermined value (for example, 0x55) as the value of the operation result (the value of the memory area M);

(4) The operation history groups having a first predetermined value (for example, the function F2) in the function field, and having a second predetermined value (for example, A00100) as the address of the operation result, and having a third predetermined value (for example, 0x55) as the value of the operation result (the value of the memory area M), and having a fourth predetermined value (for example, 0x00) as the pre-change value in the memory area M.

Herein, the first predetermined value to the fourth predetermined value are not limited to predetermined values. For example, in the case of applying the condition (1), any one arbitrary value stored in the function field of the operation history table can be read and set as the first predetermined value. As a result, it becomes possible to extract all operation history groups corresponding to the same function as that of a particular operation history group stored in the operation history table. Alternatively, a processing can be performed so that, in the operation history table, a function corresponding to two or more operation history groups is set as the first predetermined value, and a function corresponding to only single operation history group is not set as the first predetermined value (i.e., is not set as the extraction target). That is, by applying the condition (1), the operation extracting unit 64 can extract the operation history groups having the same function field (i.e., the same function F). In an identical manner, the address of any arbitrary operation result stored in the operation history table can be read to be set as the second predetermined value. Thus, by applying the condition (2), the operation extracting unit 64 can extract the operation history groups having the same function field and the same address of the operation result. In an identical manner, the value of a memory area M stored in the operation history table can be read to be set as the third predetermined value. Thus, by applying the condition (3), the operation extracting unit 64 can extract the operation history groups having the same function field, the same address of the operation result, and the same value of the operation result. In an identical manner, the pre-change value of the memory area M stored in the operation history table can be read to be set as the fourth predetermined value.

Thus, by applying the condition (4), the operation extracting unit 64 can extract the operation history groups having the same function field, the same address of the operation result, the same value of the operation result, and the same pre-change value of the memory area M.

The conditions (1) to (4) above are conditions for determining the operations having the same objective. The condition (1) is the loosest condition, and the conditions become severe as the condition number increases. Thus, the condition (4) is the most severe condition. In the case of applying the condition (1), in the example illustrated in FIG. 9, the operation history groups T1, T3, and T4 corresponding to the same function F2 are determined to have the same objective. Meanwhile, when the memory space corresponding to a single function F has a plurality of addresses, then there are cases where the condition (1) and the condition (2) yield different results. For example, in the example illustrated in FIG. 9, when the condition (1) is applied, the operation history groups T1, T3, and T4 corresponding to the same function F2 are determined to have the same objective. However, when the condition (2) is applied, then, although the operation history groups T1 and T4 are determined to have the same objective, the operation history groups T1 and T3 are not determined to have the same objective due to the different addresses. Moreover, when the condition (3) is applied, in the operation history groups T1, T3, and T4, since the addresses and the values of the memory areas M do not exactly match, they are determined to be operations for different objectives. For example, in a font color changing function, not only the operations for changing the font color into a particular color, but also changing the font color into any color, are intended to be regarded as the operations for the same objective, then the condition (1) or the condition (2) can be applied. In the case of applying the condition (4), the operation history obtaining unit 60 obtains, from the terminal device 10, not only the value after the change in the memory area M but also the value before the change in the memory area M. Then, the operation extracting unit 64 extracts, as the operations having the same objective, the operation history groups for which the function F, the address of the memory area M, the post-change value of the memory area M, and the pre-change value of the memory area M are identical.

In this way, the operation extracting unit 64 determines that the operation history groups having at least the same function F are the operations for the same objective. Alternatively, instead of extracting the same function F, the operation extracting unit 64 can extract the operation history groups having similar functions F. In this case, the storage 46 is used to store information related to the functions having a high degree of relationship (a high degree of similarity), and the operation extracting unit 64 extracts, as the operations having the same objective, the operation history groups corresponding to two or more functions defined to have a high degree of relationship. For example, although the function F2 is different from the function F5, when they are defined to be functions having a high degree of relationship, the operations related to the function F2 and the operations related to the function F5 are determined to have the same objective. That is, the condition for determining that the operations have the same objective is not limited to the condition of having the identical function F. Meanwhile, even if the operations related to the function F2 and the operations related to the function F5 do not have the same objective, they can be determined to have similar objectives and can be accordingly added in the extraction targets. In this case, the operation extracting unit 64 can be said to determine and extract the operations having the same objective or having similar objectives.

Still alternatively, the storage 46 can be used to store the degree of similarity (a numerical value indicating a level of relevance/similarity) for a combination of two functions, and, based on the degrees of similarity, the operation extracting unit 64 can determine the operations having the same objective. For example, the function for changing the font color and the function for changing the font attribute (such as bold or italic) can be defined to have the degree of similarity of "0.3", and the function for changing the font color and the function for changing the font size can be defined to have the degree of similarity of "0.2". Herein, the degree of similarity is set to a higher value in proportion to the relevance/similarity. Then, the operation extracting unit 64 considers the operation history groups corresponding to the functions having the degree of similarity to be equal to or greater than a predetermined threshold value (for example "0.3") as the operations having the same objective, and extracts those operation history groups.

Still alternatively, the storage 46 can be used to store the degree of similarity related to a combination of the function and the value of the operation result, and, based on the degrees of similarity, the operation extracting unit 64 can determine the operations having the same objective. Regarding the degree of similarity related to the combination of the function and the value of the operation result, the two functions can be same. For example, regarding the function of changing the font color, a case in which the post-change colors representing the values of the operation result are identical can be defined to have the degree of similarity of "1.0", a case in which the numerical values are slightly different but the color difference is smaller than a predetermined value (i.e., a case in which the colors can be considered to be almost the same) can be defined to have the degree of similarity of "0.8", and a case in which the color difference is equal to or greater than the predetermined value (i.e., a case in which the colors cannot be considered to be almost the same) can be defined to have the degree of similarity of "0.5". Then, the operation extracting unit 64 considers the operation history groups corresponding to the functions having the degree of similarity to be equal to or greater than a predetermined threshold value (for example. "0.7") as the operations having the same objective, and extracts those operation history groups. In this case, within the scope of the same function of "changing the font color", the degrees of similarity related to the different values of the operation result are used.

Moreover, regarding the degree of similarity related to the combination of the function and the value of the operation result, the two functions can be different to each other. For example, a state in which the value of the operation result becomes "bold" as a result of the function for "changing the font attribute" and a state in which the value of the operation result becomes "20 points" as a result the function for "changing the font size" can be defined to have the degree of similarity of "0.2", and a state in which the value of the operation result becomes "bold" as a result of the function for "changing the font attribute" and a state in which the value of the operation result becomes "8 points" as a result the function for "changing the font size" can be defined to have the degree of similarity of "0.1". Herein, the usual font size is assumed to be an intermediate font size (for example, "12 points") between the font sizes of "20 points" and "8 points". A font size larger than the usual font size is highly likely to be used to highlight the characters. Hence, such a font size is set to have a higher degree of similarity with the font attribute "bold" used for the purpose of highlighting the characters. That is, according to the degree of similarity between the functions F or according to the degree of similarity between the combination of the function F and the value of the operation result, the operation extracting unit 64 considers the operation history groups corresponding to the functions F or the operation results having the degree of similarity to be equal to or greater than a predetermined threshold value as the operations having the same objective, and extracts those operation history groups. Herein, the extraction operation can be done by varying the threshold value in a stepped manner. For example, the extraction operation can be performed by setting the initial threshold value to "0.8". When the required number of operation history groups could be extracted, then the extraction operation is ended. However, when the required number of operation history groups could not be extracted, then the threshold value is lowered to "0.5" and the extraction operation is performed again.

In this way, the operation extracting unit 64 extracts the operation history groups corresponding to either the same function F or the functions F having a predetermined relationship. Thus, it can be said that, based on the information about the functions F identified by the function identifying unit 62, the operation extracting unit 64 extracts predetermined operation history groups from among the operation history groups. Moreover, it can also be said that the operation extracting unit 64 extracts the operation history corresponding to a predetermined function (operation target function). For example, the operation extracting unit 64 extracts "the operation history groups corresponding to the function F2" or extracts "the operation history groups that correspond to the function F2, that have the address A00100 of the operation result, and that have the value 0x55 of the address". All these operation history groups represent the operation history corresponding to a predetermined function (the function F2). Alternatively, for example, when the functions F2 and F5 have a high relevance and can be considered to have the same objective, then the operation extracting unit 64 extracts the "operation history groups corresponding to the function F2 or the function F5" or extracts "the operation history groups that correspond to the function F2 and that have the address A00100 of the operation result or the operation history groups that correspond to the function F5 and that have the address A00500 of the operation result". All those operation history groups correspond to a predetermined function (the function F2 or the function F5). In this way, the predetermined function can be defined by a combination of predetermined functions F. Moreover, instead of extracting the entire operation history corresponding to a predetermined function in this way, some of the operation history corresponding to the predetermined function can be extracted. In that sense, it can be said that the operation extracting unit 64 extracts at least some of the operation histories corresponding to a predetermined function. Moreover, instead of treating all functions F as the extraction targets, the operation extracting unit 64 can treat only predetermined specific functions F as the extraction targets. For example, when the functions F1 to F5 are available, it is possible that the functions F1 to F4 are treated as the extraction targets while excluding the function F5.

Returning to the explanation of the information processor 12 with reference to FIG. 6, the index calculating unit 66 calculates an index E which is related to an efficiency of the operations extracted by the operation extracting unit 64. That is, regarding the operation history groups having the same function or regarding the operation history groups having a predetermined relationship among the respective functions F, the index calculating unit 66 calculates the index E that indicates a level of efficiency of the user operations in each of the concerned operation history groups. The index E indicates the evaluation of the efficiency of user operations in the extracted operation history group. In the first embodiment, the index E indicates the operation amount (man-hours) required by the user until the operation result gets stored in the memory space 36. In other words, the index E indicates a level (degree) of suitability of the operation details included in an operation history group.

The index calculating unit 66 calculates the index E based on the operation history group extracted by the operation extracting unit 64 (hereinafter, called the extracted operation history group). There are cases where the extracted operation history group includes a plurality of types of the operation details. In this case, the index calculating unit 66 calculates the index E based on the types of the operation details. In the first embodiment, the operation details include a click count of the mouse 32 and a keystroke count of the keyboard 30, that is, an input count for the operating unit 24, and include a movement distance of the mouse 32, that is, a movement amount of the pointer. The index calculating unit 66 calculates the index E according to the input count with respect to the operating unit 24 and the movement amount of the pointer, as well as according to an operation time required by the user.

The index calculating unit 66 extracts, from an extracted operation history group, the operation details (the unit operation history OP) for calculating the index E. More particularly, from all of the unit operation histories OP included in the extracted operation history group, the index calculating unit 66 extracts the unit operation history OP about clicking the mouse 32 and the unit operation history OP about hitting the keyboard 30. Then, the index calculating unit 66 calculates the sum total of the click count of the mouse 32 and the keystroke count of the keyboard 30 in the extracted unit operation history OP as the input count with respect to the operating unit 24 in the operation history group. Moreover, from all of the unit operation histories OP included in the extracted operation history group, the index calculating unit 66 extracts the unit operation histories OP indicating that the mouse 32 was moved. Then, the index calculating unit 66 calculates the sum total of the movement amount of the mouse 32 in the extracted unit operation history OP as the movement amount of the pointer in the operation history group. Meanwhile, the operation time required by the user represents a time from a start of the operations related to a function F to the recording of the operation result. In other words, the operation time required by the user represents a period of time from the time at which the operations related to the function F are started to the time at which the objective is achieved (i.e., to the time at which the operation result is decided). In the extracted operation history group, the index calculating unit 66 treats the time at which a window is displayed as a time at which the operations are started, and treats the time at which the memory area corresponding to the function F is changed as a time at which the objective is achieved. That is, the index calculating unit 66 calculates the period of time from the time associated with the unit operation history regarding the display of a window (in the example illustrated in FIG. 9, the unit operation history OP1) to the time associated with the unit operation history OP regarding the operation result (in the example illustrated in FIG. 9, the unit operation history OP7), and sets a calculated period of time as the operation time. Meanwhile, the time at which the operations are started is not limited to the time at which a window is displayed. Alternatively, for example, the time at which the user initially operates the operating unit 24 (in the example illustrated in FIG. 9, the unit operation history OP2) can be treated as the time at which the operations are started.

Regarding the input count with respect to the operating unit 24, the movement amount of the pointer, and the operation time required by the user as calculated in the abovementioned manner, it can be said that, smaller the values, the smaller is the operation amount required by the user. Moreover, it can be said that, smaller the operation amount required for performing a function F, the more efficient are the operations. In the following explanation, it is assumed that the operation extracting unit 64 applies the condition (1) to extract the operation history groups having the same objective as the objective corresponding to the function F2, and extracts the operation history groups T1, T3, and T4 from the operation history illustrated in FIG. 9. Thus, the three operation history groups T1, T3, and T4 are the extracted operation history groups corresponding to the function F2. Regarding the extracted operation history group T1, since the "left single click of the mouse 32" is performed twice and the "keystroke count of the keyboard 30" is eight, the index calculating unit 66 calculates the input count with respect to the operating unit 24 as "2+8=10 times", calculates the movement amount of the pointer as "80+50=130", and calculates the period of time (the time difference) from the time "01-15-2018 13:00:00.000" at which a window is displayed to the time "01-15-2018 13:00:06.100" at which the operation result is recorded as the operation time of "6.1 seconds". In an identical manner regarding the extracted operation history group T3, the index calculating unit 66 calculates the input count with respect to the operation unit 24 as "once", calculates the movement amount of the pointer as "10", and calculates the operation time as "3.0 seconds". Moreover, regarding the extraction operation history group T4, the index calculating unit 66 calculates the input count with respect to the operating unit 24 as "2+8=10 times", calculates the movement amount of the pointer as "50+60=110", and calculates the operation time as "6.0 times". Meanwhile, the input count with respect to the operating unit 24, the movement amount of the pointer, and the operation time required by the user are values obtained, for each of the operation history groups, by aggregating (summing) the values indicating the operation amount of the user as included in the unit operation history OP. Thus, those values are referred to as operation aggregate values or operation summary values.

As described above, the index calculating unit 66 extracts the operation details to be used in the calculation of the index E, and accordingly calculates the operation aggregate values. However, the types of the operation details to be used in the calculation of the index E are not limited to the explanation given above, and can be arbitrarily set. For example, the index calculating unit 66 can calculate the index E based on at least either the operation time required by the user, or the input count of the user with respect to the operating unit 24 of the terminal device, or the movement amount of the pointer of the terminal device 10 as the operation details. Alternatively, instead of summing the click count of the mouse 32 and the keystroke count of the keyboard 30, the index E can be calculated using those counts as different operation aggregate values (parameters). Meanwhile, for example, when the operating unit 24 of the terminal device 10 is a touch-sensitive panel, that is, when the terminal device 10 is a smartphone or a tablet device, then the operations such as tapping and flicking of the touch-sensitive panel represent the operation details. Moreover, the operating unit 24 can be a camera or a microphone. In this case, the operation details correspond to button operations of the camera or switch operations of the microphone. Alternatively, in a case of using the operations based on speech input or gesture input, the index E can be calculated using, as the operation aggregate values, a utterance count of the user, a utterance time, a time taken for gesture operations, and a kinetic momentum during the gesture operations.

The index calculating unit 66 calculates the index E using the extracted operation details. The index calculating unit 66 calculates the index E by inputting the operation aggregate values, which are calculated based on the extracted operation details, in a predetermined function. For example the index calculating unit 66 calculates the index E using Equation (1) given below.

$$E=f(x,y,z) \qquad (1)$$

Herein, f represents a predetermined function having x, y, and z as variables, and is set in advance. Moreover, x represents the operation time, y represents the input count, and z represents the movement amount (movement distance) of the pointer.

Moreover, when a plurality of operation aggregate values is calculated, then it is desirable that the index calculating unit 66 calculates the index E by performing different weighting for each of the operation aggregate values. For example, the index calculating unit 66 calculates the index E using Equation (2) given below.

$$E=\alpha \cdot g(x)+\beta \cdot h(y)+\gamma \cdot k(z) \qquad (2)$$

Herein, α, β, and γ represent predetermined constant numbers and, for example, are set to be values equal to or greater than zero. Moreover, g, h, and k represent predetermined functions set in advance and having x, y, and z, respectively, as variables. For example, the functions g, h, and k have monotonically increasing characteristics by which the output value becomes equal to or greater than zero. Accordingly, in this case, it can be said that, smaller the index E, the smaller becomes the operation amount that indicates the level of user operations. That is, smaller the index E, the higher is the efficiency of the user operations. The index calculating unit 66 sets, in advance, different values for α, β, and γ, and sets, in advance, the functions g, h, k to different functions; and performs different weighting for each operation aggregate value, that is, for each set of operation details, and then calculates the index E. Herein, the functions g, h, and k can be linear functions or nonlinear functions. As the simplest form of processing, the functions g, h, and k can be linear functions having the input identical to the output. That is, instead of using the functions, the weighted sum of x, y, and z can be treated as the index E.

FIG. 10 is a diagram illustrating an example of the calculation result of the operation aggregate values and the indices E. In Equation (2), when the constant number α is set to "2", the constant number β is set to "1", the constant number γ is set to "0.1", and the functions g, h, and k are linear functions having the input identical to the output, then the operation history groups T1, T3, and T4 have the indices E as illustrated in FIG. 10. That is, the operation history group T1 has the index E of "35.2", the operation history group T3 has the index E of "8.0", and the operation history group T4 has the index E of "33.0". Meanwhile, regarding the operation history groups for which the indices E have already been calculated, the index calculating unit 66 need not perform the calculation again. Alternatively, for example, the index calculating unit 66 can read the already-calculated indices E from the storage 46 and obtain the already-calculated indices E for the concerned operation history groups. In the first embodiment, the index E has the characteristic that a smaller value thereof indicates a higher efficiency (a better efficiency) of the operations. However, the relationship between the magnitude of the value of the index E and the level of efficiency of the operations can be defined in an arbitrary manner. For example, the index E can be calculated in such a way that, higher the value thereof, the higher is the efficiency of the operations. In the following explanation, the expression that "the index E is high" or the expression that "the value of the index E is high" is sometimes used to imply that "the efficiency of the user operations is high". In the first embodiment, the expression that "the index E is small", the expression that "the index E is high", and the expression that "the operation efficiency is high" have the identical meaning.

Returning to the explanation of the information processor 12 with reference to FIG. 6, based on the index E calculated by the index calculating unit 66, the operation selecting unit 68 selects, from among the operations considered to have the same objective, the operations having a predetermined type of efficiency. That is, based on the index E calculated by the index calculating unit 66, the operation selecting unit 68 selects, from among the extracted operation history groups, the operation history groups having a predetermined type of efficiency. In the first embodiment, one of the predetermined types of efficiency is having the optimum efficiency of operations. Thus, based on the index E, the operation selecting unit 68 selects, from among the operation history groups having mutually corresponding functions F, the operation history groups having the highest efficiency, that is, the operation history groups having the least operation amount of the users. More particularly, the operation selecting unit 68 compares the indices E of the extracted operation history groups and selects the operation history groups having the smallest value of the index E. In the example illustrated in FIG. 10, from among the operation history groups T1, T3, and T4, the operation selecting unit 68 selects the operation history group T3. However, as long as the operation selecting unit 68 selects the operations having the predetermined efficiency, the selection is not limited to the operation history group having the operations of optimum efficiency. For example, the operation selecting unit 68 can select the operation history groups having a higher efficiency than a predetermined standard, that is, can select the operation histories having the indices E to be smaller than a predetermined threshold value. Moreover, the operation selecting unit 68 can select a predetermined number of operation history groups in descending order of the operation efficiency, and the predetermined number can be equal to or greater than two. That is, the operation selecting unit 68 is not limited to select the operation history having the highest index E (the smallest index E), but can select the operation history having the relatively higher index E from among the operation histories.

The output controller 70 outputs, as guide information, the information about the operations (the operation history group) selected by the operation selecting unit 68, that is, the information related to the operation history group having the optimum efficiency. The output controller 70 outputs, that is, sends, to the terminal devices 10, the information related to the operation history group selected by the operation selecting unit 68 via the communicating unit 42. Moreover, the output controller 70 can output, that is, display, in the display 44, the operation history group selected by the operation selecting unit 68. The information (guide information) output by the output controller 70 represents information (operation input information) about the operation details in the operation history group selected by the operation selecting unit 68. Regarding the guide information, the detailed explanation is given later.

Figure 11:
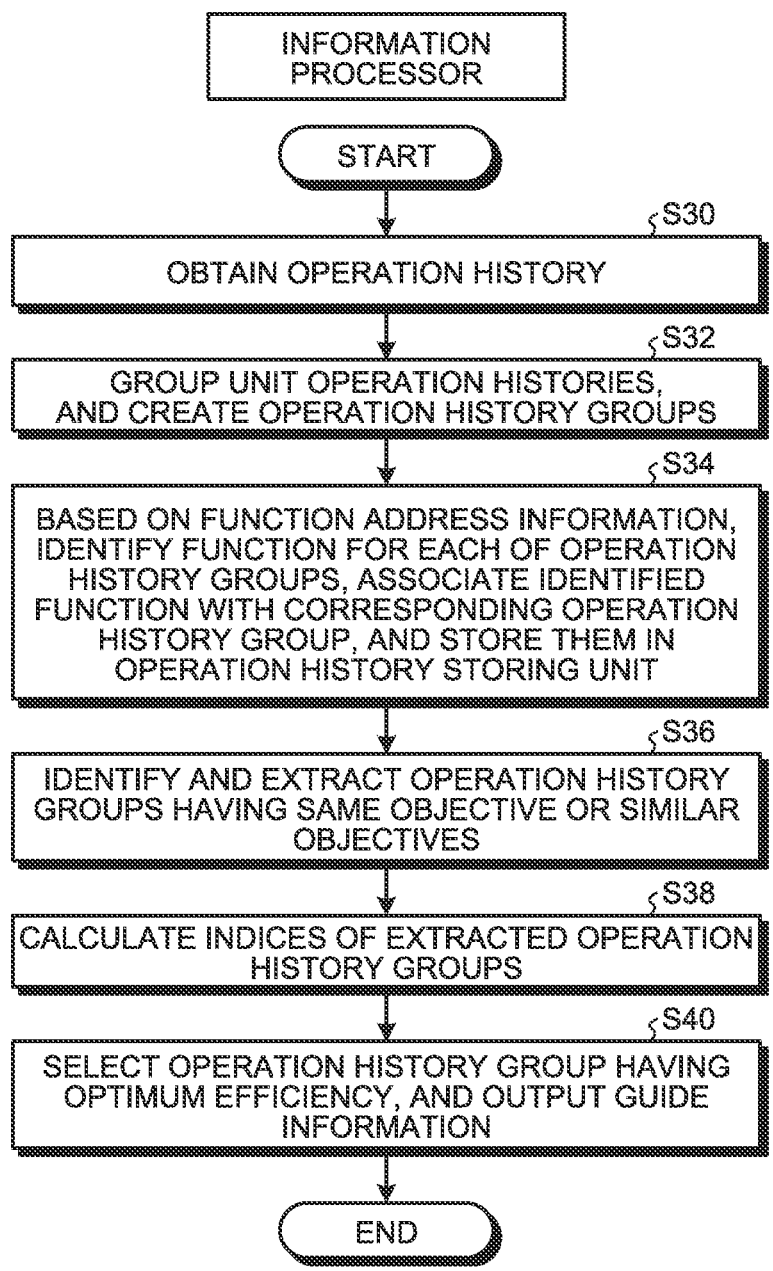
FIG. 11 is a flowchart for explaining a flow of processes performed in the information processor according to the first embodiment.

The information processor 12 is configured in the manner described above. Explained below with reference to a flowchart is a flow of processes performed in the information processor 12. FIG. 11 is a flowchart for explaining a flow of processes performed in the information processor according to the first embodiment. The flow of the processes illustrated in FIG. 11 is a flow for selecting the operation history group having the optimum efficiency. As illustrated in FIG. 11, at Step S30, the operation history obtaining unit 60 obtains the operation history from the terminal device 10 via the communicating unit 42. Then, at Step S32, the function identifying unit 62 groups the unit operation histories OP included in the obtained operation history, and creates the operation history groups. The function identifying unit 62 gathers the unit operation history OP indicating the operation result and the unit operation histories OP indicating the corresponding operation details into a single group, and creates a single operation history group. Subsequently, at Step S34, based on the function address information, the function identifying unit 62 identifies the function F for each of the operation history groups, associates the identified function F with the corresponding operation history group, and stores them in the operation history storing unit 52. The function identifying unit 62 identifies, in the function address information, the function F associated with the address of the memory space 36 at which the operation result is stored as the function F due to the operation history group.

Then, at Step S36, based on the function F identified at Step S34, the operation extracting unit 64 identifies and extracts, from among the operation history groups stored in the operation history storing unit 52, a combination of operation history groups that can be considered to have the same objective or similar objectives. More particularly, the operation extracting unit 64 performs the process above by applying one of the conditions (1) to (4) explained earlier. Herein, for the simple explanation, it is assumed that the condition (1) is applied. In this case, for example, the operation history group is extracted corresponding to each of the functions F (i.e., for each objective); such as the four operation history groups are extracted corresponding to the function F1, the three operation history groups are extracted corresponding to the function F2, and the five operation history groups are extracted corresponding to the function F3. Meanwhile, a function F for which only one operation history group is present is not used in the subsequent operations, thus the corresponding operation history group is not extracted. That is, when a plurality of operation history groups is present corresponding to a single function F, those operation history groups are extracted. The operation history groups extracted corresponding to a single function F are also referred to as "an operation history group collection". For example, when the four operation history groups are extracted corresponding to the function F1, those four operation history groups are collectively referred to as "an operation history group collection corresponding to the function F1" or as "an operation history group collection 1" in an abbreviated manner.

At Step S38, the index calculating unit 66 calculates the indices E of the operation history groups extracted by the operation extracting unit 64, and stores the indices E in the operation history storing unit 52. Herein, the index E of each of the operation history groups is calculated in numerical order of the operation history F. For example, at Step S36, when the four operation history groups are extracted as the operation history group collection 1 corresponding to the function F1 and when the three operation history groups are extracted as an operation history group collection 2 corresponding to the function F2, the index calculating unit 66 firstly calculates the index E for each of the four operation history groups in the operation history group collection 1 and then calculates the index E for each of the three operation history groups in the operation history group collection 2. Then, the index calculating unit 66 stores the operation history groups and the respective indices E in a corresponding manner to the functions F in the operation history storing unit 52. Subsequently, at Step S40, the operation selecting unit 68 selects the operation history group with the optimum efficiency and creates information related to the selected operation history group as guide information, and the output controller 70 outputs the guide information to the terminal device 10.

Figure 12:
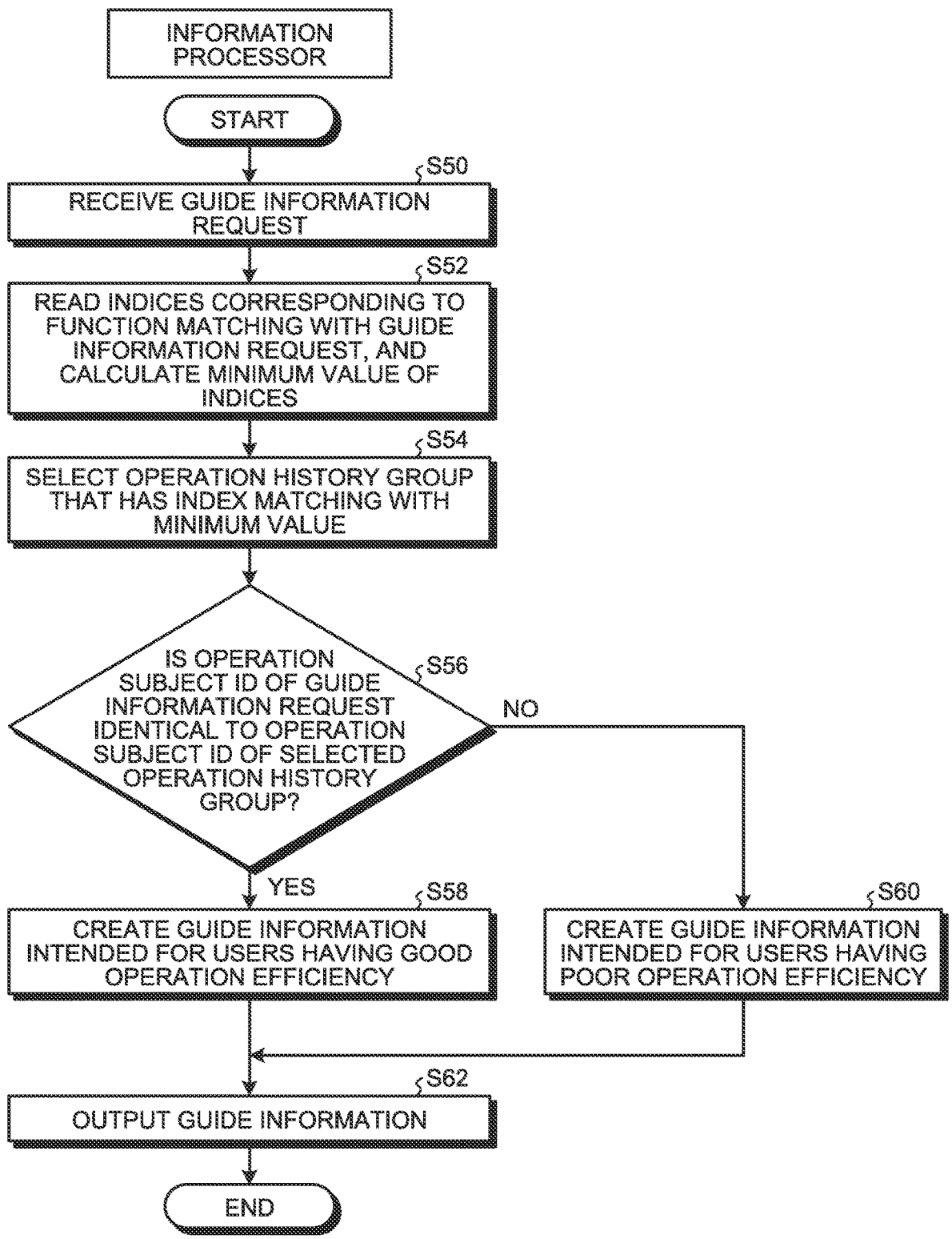
FIG. 12 is a flowchart for explaining the detailed flow of processes performed at Step S40 illustrated in FIG. 11.

Given below is a detailed explanation of the flow of processes performed at Step S40 illustrated in FIG. 11. FIG. 12 is a flowchart for explaining the detailed flow of the processes performed at Step S40 illustrated in FIG. 11. As illustrated in FIG. 12, firstly, at Step S50, the controller 40 receives a guide information request (a guide information request message) from the terminal device 10 via the communicating unit 42. The terminal device 10 can send a guide information request to the information processor 12 at an arbitrary timing. The guide information request includes the operation subject ID (the user ID of the user of the terminal device 10 or the terminal ID of the terminal device 10) and includes a function F as the information for specifying the guide information (guide specification information). The operation subject ID included in the guide information request indicates the terminal device 10 to which the guide information is to be output or indicates the user of that terminal device 10. The terminal device 10 to which the guide information is to be output is referred to as the "target terminal" and the user of the target terminal is referred to as the "target user". Then, at Step S52, the operation selecting unit 68 reads, from the operation history storing unit 52, the indices E corresponding to the function F that match with the guide specification information, and calculates the minimum value of the read indices E. That is, the minimum value indicates the index E having the smallest value from among a plurality of indices E corresponding to the functions F that match with the guide specification information. The minimum value can be calculated according to various algorithms. For examples, the indices E that are read from the operation history storing unit 52 can be sorted in descending order and the initial (first) value can be obtained.

Subsequently, at Step S54, from among the operation history groups corresponding to the function F that match with the guide specification information, the operation selecting unit 68 selects the operation history group that has the index E matching with the minimum value calculated at Step S52. In other words, the operation selecting unit 68 selects the operation history group that has the index E to be equal to the minimum value calculated at Step S52. That is, regarding the function F specified by the terminal device 10, the operation selecting unit 68 selects the operation method (the operation history group) having the optimum efficiency (highest efficiency). When there is a plurality of the operation history groups that matches with the minimum value, then all of the operation history groups can be selected or one of the operation history groups can be selected. In the case of selecting one of the operation history groups, for example, the operation history group at the latest operation time can be selected. Alternatively, the following method can be performed. The operation subject IDs corresponding to the operation history groups selected in the past by the operation selecting unit 68 are stored in the storage 46, and are tallied to calculate the selection count for each of the operation subject IDs. Then, the operation history corresponding to the operation subject ID having the highest selection count in the past is selected with priority. For example, assume that three operation history groups corresponding to the users A, B, and C are present as the operation history groups for which the indices E have the minimum value. When the previous selection count for the operation history groups corresponding to the users A, B, and C are "7", "10", and "3", respectively, then, at the time of selecting and outputting one of the three operation history groups, the operation history group corresponding to the user B is selected due to the highest selection count in the past. That is done based on the knowledge that the operation skill is a personal skill and that the operations performed by a user who has performed excellent operations in the past is highly likely to perform excellent operations this time too.

Subsequently, at Step S56, the operation selecting unit 68 compares the operation subject ID included in the guide information request received at Step S50 with the operation subject ID of the operation history group selected at Step S54, and determines whether the two operation subject IDs are identical. When the two operation subject IDs are identical (Yes at Step S56), the system control proceeds to Step S58. However, when the two operation subject IDs are not identical (No at Step S56), then the system control proceeds to Step S60. At Step S58, the operation selecting unit 68 creates a guide information intended for the users having the good operation efficiency. That is, regarding the function F specified in the guide specification information, since it is determined that the user who requested for the guide information has the optimum operation method, a guide information intended for the users having the good operation efficiency is created in response to the guide information request. Such guide information is also referred to as "a praiseworthy guide information". Regarding the praiseworthy guide information, the detailed explanation is given later. After the operation at Step S58 is performed, the system control proceeds to Step S62.

At Step S60, the operation selecting unit 68 creates a guide information intended for the users having poor operation efficiency. Herein, a "user having poor efficiency" implies that there are other users having better efficiency (higher efficiency) than the concerned user. That is, regarding the function F specified in the guide specification information, since there are other users having better efficiency than the efficiency of the operation method by the user who requested for the guide information, a guide information intended for the users having poor efficiency is created in response to the guide information request. The guide information intended for the users having poor efficiency includes the information related to the operation method (operation history group) having the optimum efficiency. Such guide information is also referred to as "an educational guide information". Regarding the educational guide information, the detailed explanation is given later. After the operation at Step S60 is performed, the system control proceeds to Step S62.

At Step S62, the operation selecting unit 68 outputs the guide information, which is created either at Step S58 or at Step S60, to the terminal device 10 via the output controller

70. That is, the operation selecting unit 68 makes the output controller 70 output the guide information. The explanation given above is about the detailed operations performed at Step S40. The guide information created at Step S58 and Step S60 is information based on the operation method (operation history group) having good efficiency, and can be said to be information based on the index E. Moreover, in the first embodiment, although the guide information intended for the users having good efficiency is created separately from the guide information intended for the users having poor efficiency, it is not always necessary to create the separate guide information. Alternatively, for example, a single guide information can be created for a single function F, and the same guide information can be output to all of the terminal devices 10. Meanwhile, at Step S54, the selection operation can be performed with respect to the operation history group which corresponds to the functions F matching with the guide specification information and which has a different operation subject ID than the operation subject ID included in the guide information request. That is, the selection of operation history groups having the smallest index E can be performed with respect to the operation history groups of the users different from the user who issued the guide information request. As a result of such operations, the "praiseworthy guide information" is not output, and only the "educational guide information" is output. According on the situation, as compared to the operations performed by the user who issued the guide information request, a sequence of the operations having the lower operation efficiency may be output as the guide information. However, knowing the sequence of the operations of other users is beneficial even to the users having the good operation efficiency. Hence, such guide information is also beneficial.

In this way, depending on whether or not the user who is related to the operation history selected by the operation selecting unit 68 (i.e., the operation subject ID of the operation history group selected at Step S54) is identical to the user of the terminal device 10 to which the guide information is to be sent (i.e., the operation subject ID included in the guide information request), the output controller 70 outputs different types of the guide information. Meanwhile, the determination operation performed at Step S56 can be modified in the following manner. At Step S56A that is substituted for Step S56, the operation selecting unit 68 determines whether or not the index E of the operation history corresponding to the operation subject ID and the function F included in the guide information request received at Step S50 is identical to the minimum value of the index E as calculated at Step S52. In either case, it can be said that, depending on whether or not the index E of the target user is the smallest among the indices E corresponding to the function F, the different types of the guide information is output.

In the example illustrated in FIG. 10, the operation history group T3 (the operation history group corresponding to the user C) is selected as the operation history group having the smallest index E. Thus, the output controller 70 sends the guide information related to the operation history group T3 to the terminal device 10. The operation history group T3 represents the operations performed by the user C. When the user A or the user B is the target user, then the educational guide information related to the operation history group T3 is sent to the terminal device 10 of the target user (i.e., to the target terminal). When the user C is the target user, then the praiseworthy guide information related to the operation history group T3 is sent to the target terminal. Alternatively, the educational guide information related to the operation history group T3 can be sent to all of the terminal devices 10 including the terminal device 10 of the user C. Still alternatively, instead of sending the guide information to all of the terminal devices 10, it can be sent only to some of the terminal devices 10. For example, the educational guide information can be sent only to the users having a poorer efficiency than a predetermined conditions, that is, only to the terminal devices 10 of a user whose index E is greater than a predetermined threshold value.

At Steps S52 and S54 described earlier, the minimum value of the index E corresponding to the same function F as that of the guide specification information is calculated, and the operation history group corresponding to that minimum value is selected. However, that is not the only possible case. Alternatively, it is possible to perform a modified process as explained below. Firstly, at Step S52A that is substituted for Step S52, based on the index E related to the function F of the target user, a search condition related to the index E is set. As the search condition, either the search target value or the search range is used. The search target value is set to be a smaller value than the index E related to the function F of the target user. For example, the value obtained by subtracting a predetermined value (for example "8") from the index E of the target user can be used, or the value obtained by multiplying a predetermined value (for example, "0.8") to the index E of the target user can be used. The search range is a numerical value indicating a range of the index E, and is composed of an upper limit value and a lower limit value. More particularly, a predetermined range in a direction of smaller values than the index E of the target user is set as the search range. For example, when the index E of the target user is "30.0", the range "between 20 or more and 30 or less of the index E" is set as the search range. In that range, the value obtained by subtracting a predetermined value (for example "10") from the index E of the target user can be used, or the value obtained by multiplying a predetermined value (for example, "0.7") to the index E of the target user can be used. Alternatively, using the value ("25") obtained by subtracting a first predetermined value (for example, "5") from the index E of the target user and using the value ("20") obtained by subtracting a second predetermined value (for example, "10"), which is greater than the first predetermined value, from the index E of the target user, the range "between 20 or more and 25 or less of the index E" can be set as the search range.

Subsequently, at Step S54A that is substituted for Step S54, the operation history group is selected based on the search condition set at Step S52A. When the search target value is used as the search condition, then the operation history group having the closest index E to the search target value is selected. For example, the operation history group having the smallest difference between the index E thereof and the search target value is selected. For example, assume the following: the search target value is set to "20"; the operation history group T5 has the index E of "18"; the operation history group T6 has the index E of "23"; and the operation history group T7 has the index E of "27". In that case, the differences between the search target value and the indices E of the operation history groups T5, T6, and T7 become equal to "−2", "+3", and "+7", respectively. Thus, from among those operation history groups, the operation history group T5 having the smallest difference with the search target value (the smallest absolute value of the difference) is selected. Alternatively, the operation history group having the index E that is closest to and greater than the search target value can be selected. In that case, the operation history group T6 gets selected. Alternatively, instead of using the differences between the search target value and the indices E, each index E can be divided by the search target value and the operation history group for which the resultant value is closest to "1" can be treated as the operation history group having the closest index E to the search target value. When a plurality of operation history groups has the closest value, one of the operation history groups can be randomly selected or all of the operation history groups can be selected. In the case of using the search range as the search condition, the operation history group having the index E matching with the search range is selected. When a plurality of indices E is matching with the search range, one of the indices E can be randomly selected or all of the indices E can be selected. Alternatively, the operation history group having the closest value to the lower limit value of the search range can be selected. After the operation at Step S54A is performed, the system control proceeds to Step S56. When the index E of the target user is equal to the minimum value of the indices E corresponding to the functions F, the operation history group having the closest value to the search target value belongs to the target user, and the two operation subject IDs are determined to be identical (Yes at Step S56).

As a result of performing such operations, the operation history group having the index E of somewhat higher efficiency than the index E of the target user can be selected. That is, it becomes possible to select the operations with the efficiency that is higher than the efficiency of the operations of the target user and that is not much different from the efficiency of the operations of the target user. For example, assume that the indices E of the functions F have the minimum value of "10", have the second smallest value of "15", have the third smallest value of "20", and have the fourth smallest value of "25", and that the search range is "between 20 or more and 25 or less". Then, the operations corresponding to the minimum value "10" are not selected, but the operations corresponding to the third smallest value of "20" are selected, and the guide information is created based on the selected value. That is done based on a knowledge that it is sometimes easy to understand and beneficial (i.e., is of high value) for the target user when the target user is provided with information related to the operations having the efficiency at a close level to his or her efficiency of the operations, instead of providing the target user with information related to the operations having the optimum efficiency. For example, the operations having the optimum efficiency are highly likely to have been performed by a proficient and advanced user. Thus, when the target user is a beginner without proficiency in the operations, the information related to the operations performed by an advanced user is likely to be too difficult and is not helpful (i.e., is of low value). On the other hand, as a result of performing the modified process, the operations that largely differ from the efficiency of the operations of the target user can be excluded, and appropriate information that is easily acceptable by the user can be provided. That is, it becomes possible to provide an appropriate operation assistance information that matches with the operation proficiency of the user.

Display of Guide Information

Figure 13:
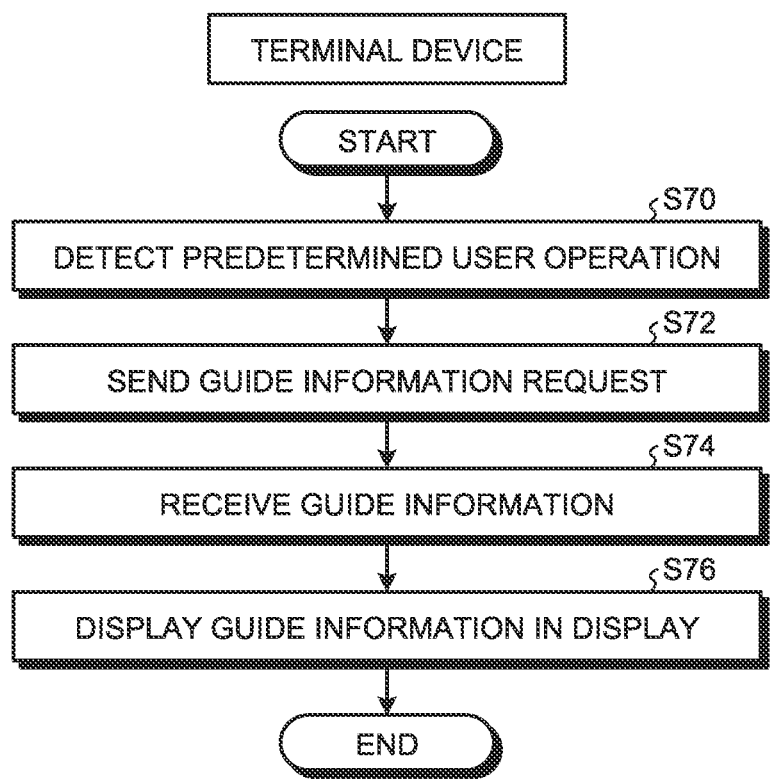
FIG. 13 is a flowchart for explaining a display flow for displaying information at the terminal device according to the first embodiment.

As described above, in response to the guide information request issued by the terminal device 10, the information processor 12 sends, to the terminal device 10, the guide information based on the operation history group having the optimum efficiency. Upon receiving the guide information, the terminal device 10 displays it in the display 26. Given below is an explanation of a method of displaying information. FIG. 13 is a flowchart for explaining a display flow for displaying information at the terminal device according to the first embodiment. The controller 20 of the terminal device 10 monitors the user operations of the terminal device 10. At Step S70, the controller 20 detects a predetermined user operation as a trigger for displaying the guide information. As the predetermined operation, various types of operations can be defined in advance. Herein, it is assumed that an operation of displaying a window of a computer program is defined as a detection target. Then, at Step S72, the controller 20 sends a guide information request to the information processor 12 via the communicating unit 22. The controller 20 creates the guide information request that includes the operation subject ID representing either the user ID of the user of the terminal device 10 or the terminal ID of the terminal device 10, and includes the functions F corresponding to the displayed window, and sends the guide information request to the information processor 12. Meanwhile, data (not illustrated) indicating the correspondence relationship between the window and the function F is stored in the storage 29. When a plurality of functions F corresponds to a single window, then those functions F can be included in the guide information request. At Step S74, the controller 20 receives the guide information from the information processor 12 via the communicating unit 22. At Step S76, the controller 20 makes the display 26 display the guide information which is received at Step S74. That is, the display 26 displays the guide information. As described earlier, in response to the guide information request, the information processor 12 sends one of the two types of the guide information. Thus, at Step S76, either one of the two types of the guide information is displayed. This is the explanation of the flow of processes of the guide information display operation.

In the explanation given above, the guide information is displayed with the display of a window as the trigger. However, that is not the only possible case, and some other method can be performed. For example, the controller 20 can display the guide information with an activation of a computer program as the trigger. In that case, at Step S72, the controller 20 sends the guide information request which includes all of the functions F of the computer program to the information processor 12. Moreover, at Step S74, the controller 20 receives the guide information related to all of the functions F of the computer program. Then, at Step S76, the display 26 displays the information related to all of the functions F. Alternatively, the login of the user to the terminal device 10 can be used as the trigger for displaying the guide information. In this case, at least one combination of a program identifier for identifying a computer program (such as an application program) available to the user and at least one function F thereof for at least one program is to be included in the guide information request, and then the guide information request is sent. Still alternatively, an elapse of a predetermined period of time since the activation of the computer program can be used as the trigger. Still alternatively, a change in the memory areas M can be used as the trigger. In that case, the addresses of the memory area M in which the change in the value is detected can be included in the guide information request, instead of including the functions F, and then the guide information request can be sent. The information processor 12 refers to the function address information table, converts the addresses included in the guide information request into the function F, and performs the guide information processing. Meanwhile, the addresses of the memory area M and the values of the addresses can also be included in the guide information request. Moreover, the pre-change values of the memory area M can also be included in the guide information request. As a result of including the post-change values of the memory area M and the pre-change values of the memory area M in the guide information request, the information processor 12 becomes able to identify, with higher accuracy, the operation history having the same objective as the user operations, and thus becomes able to provide the guide information having higher accuracy. That is, the operation method closer to the user-intended objective can be accurately selected and provided.

Figure 14:
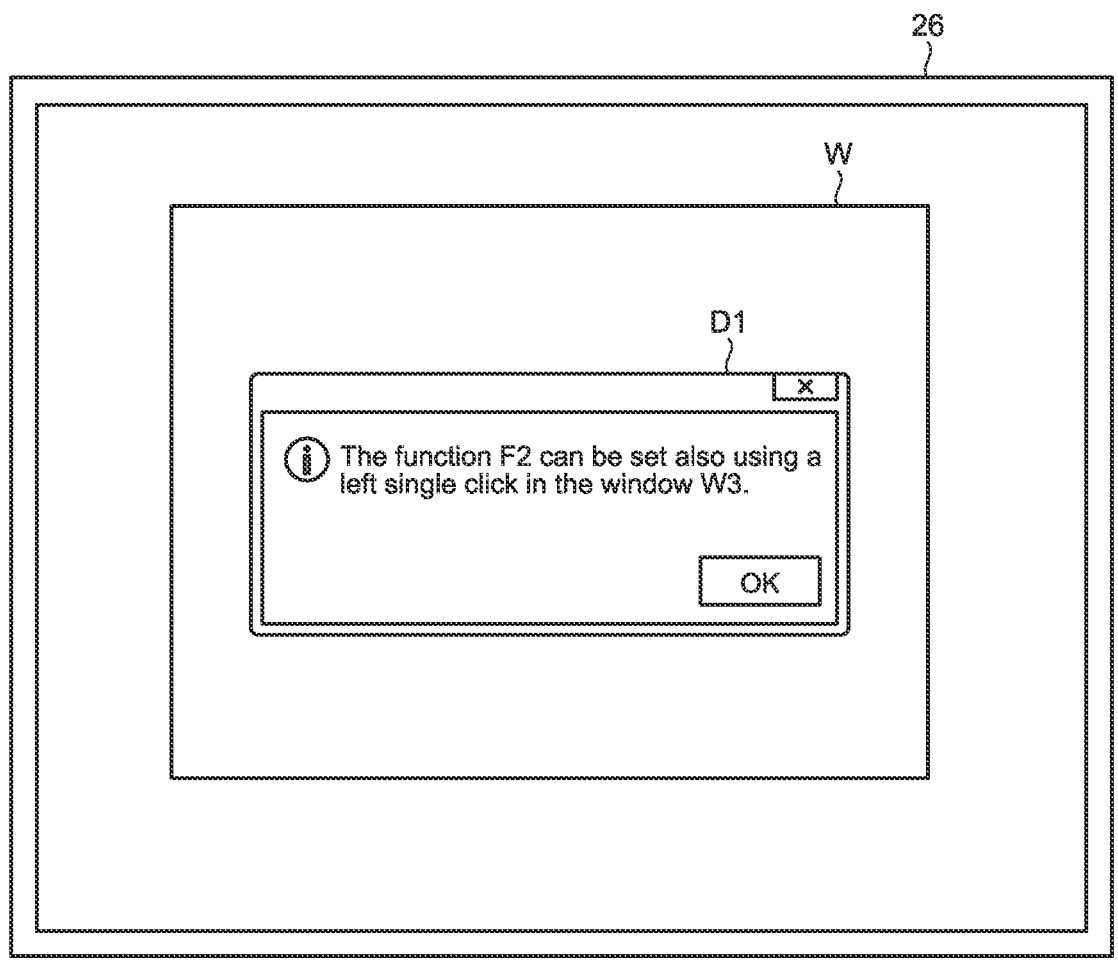
FIG. 14 is a diagram illustrating an example of a screen in which educational guide information created at Step S60 is displayed.
Figure 15:
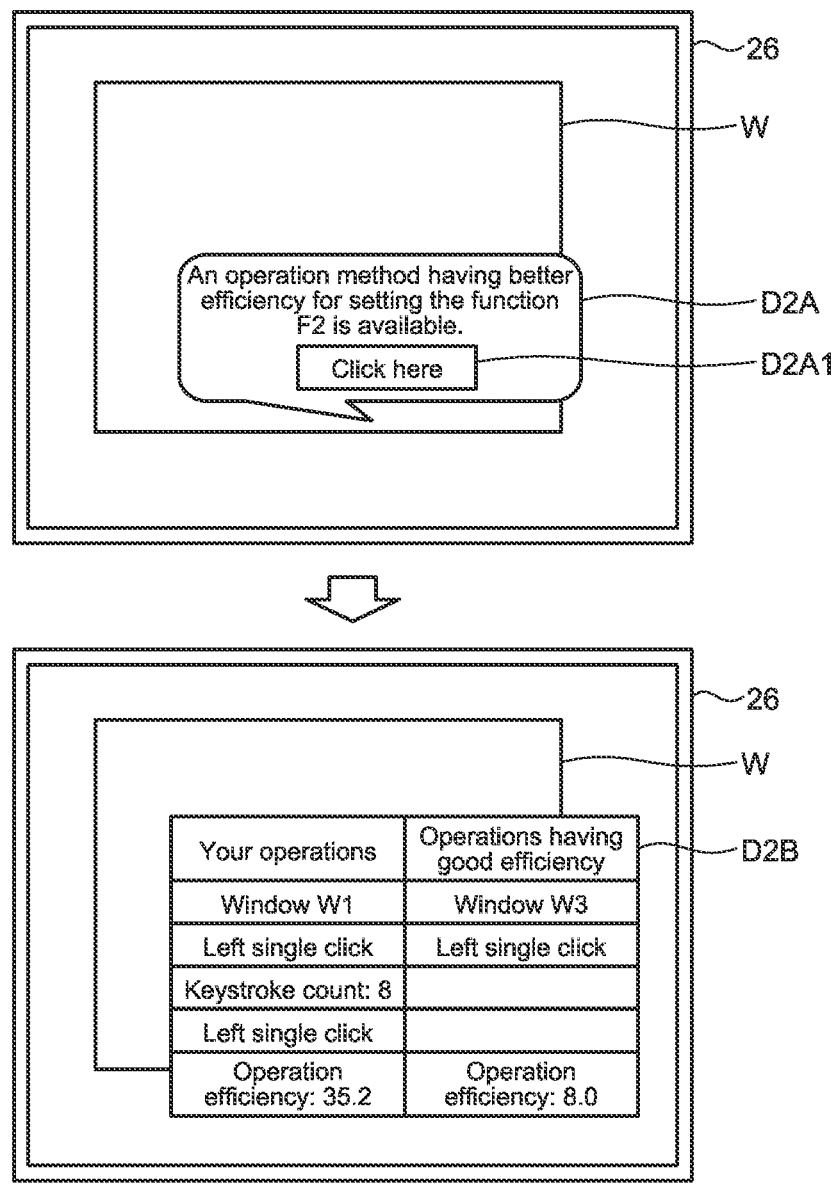
FIG. 15 is a diagram illustrating an example of a screen in which educational guide information created at Step S60 is displayed.

Given below is an explanation of the method for displaying the guide information. FIGS. 14 and 15 are diagrams illustrating an example of a screen in which the educational guide information created at Step S60 is displayed. The terminal device 10 displays, as the educational guide information, the operation details included in the operation history having the optimum efficiency. As illustrated in FIG. 14, when a window W corresponding to a function F is displayed, the controller 20 displays a window D1 indicating the educational guide information as, for example, a popup window in the display 26. In the window D1, the operation details of the operation history group having the optimum efficiency are displayed as the educational guide information. In the example illustrated in FIG. 14, in the window D1, the following sentence (message) is displayed: "The function F2 can be set also using a left single click in the window W3.". For example, when the user A illustrated in FIG. 9 is the target user, the window D1 is used to display the operation details of the user C as the operation details having better efficiency than the past operation details of the user A. Meanwhile, in the message mentioned above, the window referred to by the reference sign "W3" either can be the same window as or can be a different window from the "window W" corresponding to the function F for the past operations of poor efficiency.

Alternatively, the terminal device 10 can display the educational guide information as illustrated in FIG. 15. That is, as illustrated in FIG. 15, the controller 20 displays a window D2A in the display 26 in a corresponding manner to the window W corresponding to the functions F, the window D2A indicating that an operation having better efficiency than the operation of the target user is available. In the window D2A, the following sentence is displayed: "An operation method having better efficiency for setting the function F2 is available". Moreover, a display D2A1 indicating "Click here" is also displayed. That is, in the window D2A, information notifying that an operation having better efficiency is available is displayed along with a click location (link) for displaying the operation details having better efficiency. When the user clicks on the display D2A1, a window D2B is displayed. The window D2B represents information related to the operation history group having the optimum efficiency, and represents the information indicating the operation details in the operation history group having the optimum efficiency. For example, when the user A illustrated in FIGS. 9 and 10 is the target user, in the window D2B, the operation details (sequence of operations) having poor efficiency by the user A in the past are displayed along with the operation details (sequence of operations) having the optimum efficiency by the user C. Meanwhile, in the example illustrated in FIG. 9, the user C performs scrolling. However, the necessity of the scrolling changes depending on the situation. Thus, as illustrated in FIG. 15, the scrolling can be omitted from the sequence of the operations in the guide operation. Alternatively, the scrolling can be displayed without omission in the guide information. In this way, since the operation details having poor efficiency and the operation details having good efficiency are displayed in a comparative manner, the display can be provided in a very easy-to-understand manner for the user. Moreover, the detailed information is not displayed suddenly, and displayed by the click of the user when the user desires the detailed information. Thus, unnecessary display space is not taken and excessive information is not displayed. That makes it easier for the user to concentrate on the operations that are supposed to be performed essentially. Meanwhile, when the user of the terminal device 10 has not previously used any function F corresponding to the window W, the display of a "Your operations" column is omitted in the window D2B.

Figure 16:
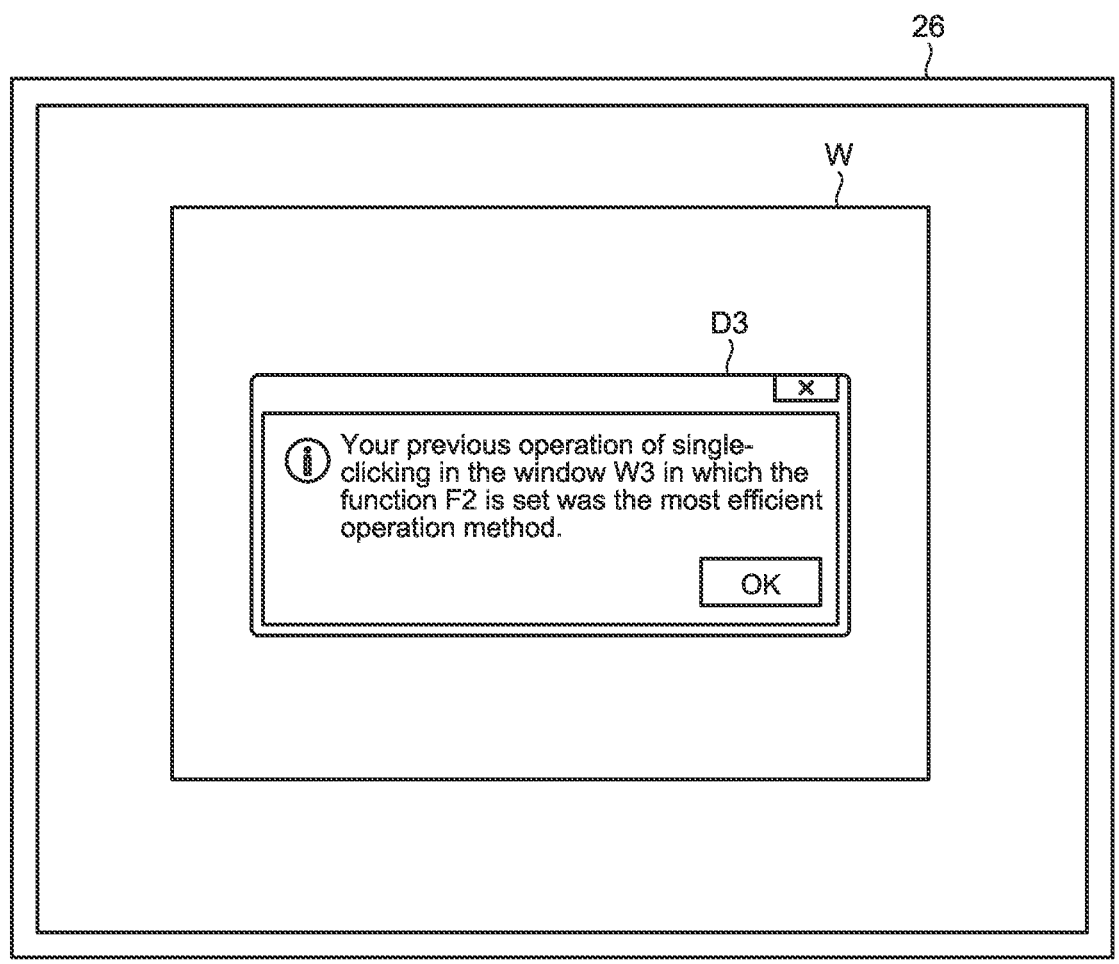
FIG. 16 is a diagram for explaining an example of a screen in which praiseworthy guide information created at Step S58 is displayed.
Figure 17:
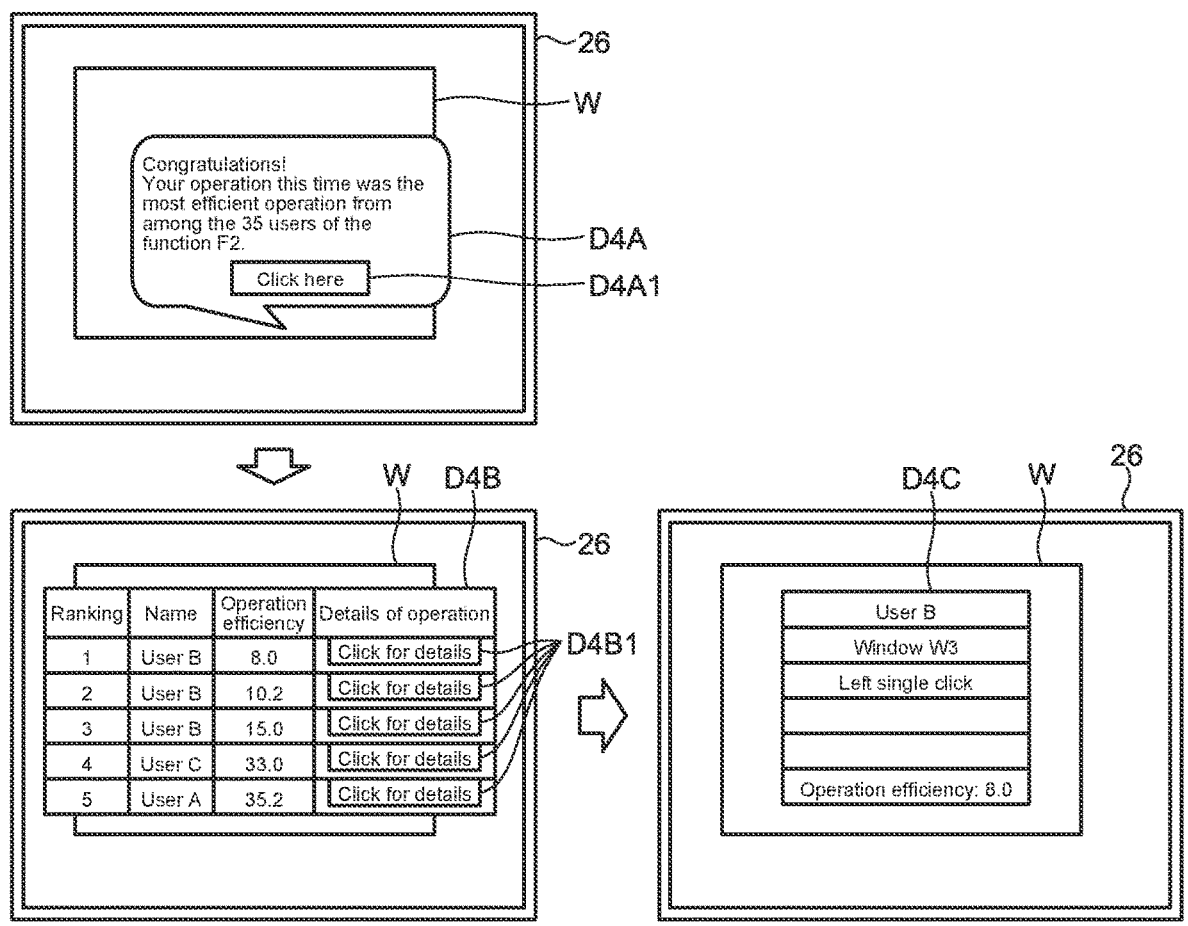
FIG. 17 is a diagram for explaining an example of a screen in which praiseworthy guide information created at Step S58 is displayed.

FIGS. 16 and 17 are diagrams for explaining an example of a screen in which the praiseworthy guide information created at Step S58 is displayed. When the past operations of the target user had the optimum efficiency, then the terminal device 10 displays the praiseworthy guide information. As illustrated in FIG. 16, when the window W corresponding to the functions F is displayed, the controller 20 displays a window D3 indicating the praiseworthy guide information as, for example, a popup window in the display 26. In the window D3, the information indicating that the past operations of the user of the concerned terminal device 10 had the optimum efficiency is displayed as the praiseworthy guide information. Herein, the following sentence (message) is displayed: "Your previous operation of single-clicking in the window W3 in which the function F2 is set was the most efficient operation method.".

Meanwhile, from among the operations related to the functions F, when the operations of the target user had the optimum efficiency, the terminal device 10 can display the praiseworthy guide information as illustrated in FIG. 17. That is, as illustrated in FIG. 17, the controller 20 displays windows D4A, D4B, and D4C, which indicate the praiseworthy guide information, in a sequentially shifting manner in the display 26. In the window D4A, it is indicated that "The operation details corresponding to the function (the function F2) used in the past by the user had the optimum efficiency from among the 35 users who are compared for the efficiency". In this way, as a result of displaying the number of users compared for the efficiency, the user who is browsing can be motivated to "get creative and perform operations with better efficiency". Moreover, in the window D4A, a display D4A1 is displayed on which the user can click. When the user clicks on the display D4A1, the window D4B is displayed.

The window D4B is used to indicate the information about the users who had performed efficient operations regarding the functions F. In the example illustrated in FIG. 17, in the window D4B, the information is displayed about the top five users who had performed the efficient operations. In a "ranking" column, the ranking is displayed in descending order of the operation efficiency. In the example illustrated in FIG. 17, the user having the ranking "1" has the highest operation efficiency. In a "name" column, the names (nicknames or real names) of the users as registered in advance are displayed. In an "operation efficiency" column, the values of the index E indicating the level of the operation efficiency are displayed. As described earlier, smaller the value of the index E, the higher is the operation efficiency. The information such as the user names and the indices E that are displayed in the screen is included in the guide information received by the terminal device 10 from the information processor 12. Meanwhile, when a single user performs the operations with a plurality of operation details, the same user (the user B) can be displayed for a plurality of times for each of the operation history groups as illustrated in FIG. 17. Moreover, in the window D4B, the user information can be displayed regarding all of the operation history groups extracted by the operation extracting unit 64 of the information processor 12, or the operation history groups of only a predetermined number of high-order users (five out of 35) can be displayed as illustrated in FIG. 17. Alternatively, the result aggregated within a specific period of time, such "today's top 10", can be displayed. Meanwhile, in the window D4B, corresponding to the information about each of the operation history groups, displays D4B1 are displayed on which the user can click. When the user clicks on any display D4B1, the window D4C is displayed that indicates the operation details of the operation history group corresponding to the clicked display D4B1. In the window D4C, as the detailed information of the operations of each user displayed in the window D4B, the operation details (the sequence of operations) of the operation history group are displayed. As a result of performing the display as illustrated in FIG. 17, the browsing user not only gets to know about the operation details having good efficiency, but also gets to know about the users who performed the operations having good efficiency. For example, each user can be set to allow disclosure of his or her contact details or not and, regarding the users who allow the disclosure of the contact details, the controller 20 can display the contact details in the window D4B illustrated in FIG. 17. That is, in the list of users having good operation efficiency, contact information such as an email address, an account information of social networking services (SNS), and a telephone number can be displayed. Alternatively, a function enabling exchange of information (exchange of messages) among the users can be provided as a result of coordination between the terminal device 10 and the information processor 12. Thus, when a user browses through such a display, he or she can directly contact the users having good efficiency and exchange information. As a result, the user who has performed the operation with better efficiency can directly teach the operation sequence with better efficiency to other users in detail. Moreover, the user community for using an application also is activated, and it can be expected to have an increase in the "admirers" of that application, thereby leading to long-term revenue from the application.

As described above, the controller 20 cause the display 26 to display the guide information, that is, the information based on the operation history groups having good efficiency. Meanwhile, the information processor 12 can aggregate the operation efficiency of a plurality of number of times of the operations performed within a predetermined period of time and create an operation efficiency ranking. For example, the operation history of the previous one month is collected. Then, for a user who performed the operations related to a particular function (for example, the function F2) for 10 times within that period, ten indices E are calculated, and the representative value (such as an average value, a median value, or a mode value) of those indices E is calculated. Then, the operation efficiency ranking is created according to the representative value of the indices E of each user. Furthermore, the information processor 12 can create the operation efficiency ranking using a degree of variability in the indices E. For example, the operation history of the previous one month is collected. Then, for a user who performed the operations related to a particular function (for example, the function F2) for 10 times within that period, ten indices E are calculated, and the representative value of those indices E and a value indicating a degree of variability (such as a variance or a standard deviation) of those indices E is calculated. Thus, a user having a smaller representative value and a smaller value indicating the degree of the variability can be said to be a user who performs operations in a stable and efficient manner. Thus, the operation efficiency ranking is so created that such a user is ranked higher. For example, assume that there are two users (users X and Y) having almost the same representative values of the indices E and that the user X has the value "3" indicating the degree of variability and the user Y has the value "10" indicating the degree of variability. In that case, it can be said that the user X performs the operations of similar efficiency in a stable manner. Thus, the user X is ranked higher. Moreover, the information processor 12 can create the operation efficiency ranking based on a rate of improvement of the operation efficiency. For example, the information processor 12 calculates, for each user, the rate of improvement of the operation efficiency indicating an extent of improvement in the operation efficiency related to a particular function (for example, the function F2) within one month. In this case, for example, the value obtained by dividing the latest operation efficiency by the operation efficiency at a point of time in the past (one month earlier) is treated as the rate of improvement in the operation efficiency. Then, the information processor 12 sends the operation efficiency ranking (ranking information) to the terminal device 10. The terminal device 10 displays the received ranking information in the display 26. For example, the controller 20 can receive the ranking information, which indicates the rate of improvement in the operation efficiency of each user, from the information processor 12 via the communicating unit 22, sort the users in descending order of the rate of improvement, and display the sorted result as the operation efficiency ranking in the display 26. Meanwhile, instead of creating the ranking information in the information processor 12, the ranking information can be created at the terminal device 10.

Meanwhile, the controller 20 can display, in the display 26, information concerning GUI (Graphical User Interface) based information such as information indicating which button of which menu is clicked in the operation having good efficiency or in the operation having poor efficiency, or information indicating which control is selected in the operation having good efficiency or in the operation having poor efficiency. In this case, for example, the controller 20 records, in the operation history storing unit 38, the information about a screen coordinates (for example, a position of a pointer of the mouse) during an operation. Moreover, regarding the controls such as forms and buttons of applications, correspondence information of names of the controls and screen coordinates is provided in a form of a separate table. The controller 20 obtains the names of the controls in the operation from the information about the coordinates by referring to the table.

Meanwhile, the controller 20 can also cause the display 26 to display information that recommends a setting for performing operations with good efficiency. For example, in the operations for performing a particular function F, when using a keyboard shortcut results in the optimum efficiency, then the controller 20 can cause the display 26 to display a method for setting the keyboard shortcut. As a result of such a display, a method for setting the keyboard shortcut can be recommended to a user who has poor efficiency and who has not have the keyboard shortcut. The information related to the method for performing operations with good efficiency can be provided either to all users or to the users having poorer efficiency than a predetermined condition such as having the indices E to be equal to greater than a predetermined value. As the predetermined value of the index E, either an average value of the past values can be used or the most recent value can be used.

As described above, the information processor 12 according to the first embodiment includes the operation history obtaining unit 60, the function identifying unit 62, the operation extracting unit 64, the index calculating unit 66, the operation selecting unit 68, and the output controller 70. The operation history obtaining unit 60 obtains the operation history created by the user operations at the terminal device 10. The function identifying unit 62 identifies, as the operation target function, a function F performed by the user operations based on the obtained operation history. The operation extracting unit 64 extracts predetermined operation histories from the obtained operation history based on the information about the operation target function identified by the function identifying unit 62. The index calculating unit 66 calculates the indies E indicating the level of efficiency of the operations for the operation histories extracted by the operation extracting unit 64. The operation selecting unit 68 selects the operation history with predetermined efficiency based on the indices E. The output controller 70 outputs the guide information based on the operation history selected by the operation selecting unit 68.

The terminal device 10 performs a processing according to the user operations and, for each user, the operation details of the user for the processing are different. Thus, in order to improve the efficiency of the tasks using the terminal device 10, the operation details (the sequence of operations) of the user need to be improved. The information processor 12 according to the first embodiment obtains the operation history of the user and, based on the function F by the user operations identified based on the operation history, extracts the predetermined operation histories. Then, based on the indices E indicating the efficiency of the extracted operation histories, the information processor 12 selects the operation history with predetermined efficiency and outputs the guide information for the operation history. The user can check the information for the operations with the predetermined efficiency, and can accordingly improve the operation details. Thus, the information processor 12 becomes able to assist (support) in achieving improvement in the efficiency of the user operations.

Meanwhile, the operation history obtained by the operation history obtaining unit 60 includes the address information in the memory space in which the operation result of the user operations is stored. The function identifying unit 62 refers to the function address information indicating the corresponding relationship between the addresses in the memory space 36 and the functions and identifies the function F corresponding to the address information in the memory space included in the obtained operation history as the operation target function. In the information processor 12, since the operation target function is identified based on the information in the memory space 36, the objective of the operations can be determined in an accurate manner. Thus, the efficiency of the operations can be compared with the operations of the same objective or similar objectives of the user operations as a target for comparison, and without the operations of an entirely different objective as the target for comparison. As a result, information that is helpful in improving the operation efficiency of the user can be provided by excluding the information for the operations with the entirely different objective from the objective of the user operations (i.e., by excluding information of low value for the user).

Moreover, the operation extracting unit 64 extracts a plurality of the operation histories for the same operation target function. Regarding each of the plurality of the operation histories extracted, the index calculating unit 66 calculates the index E. The operation selecting unit 68 selects, from among the operation histories for which the indices E are calculated, the operation history of a relatively higher index E. In the information processor 12, the operation history is selected by comparing the indices E of the operation histories for the same operation target function (the function F). Thus, from among the operations with the objective which is the same as the objective of the user operations, the operations with high efficiency can be selected with accuracy. For this reason, information that is helpful in improving the operation efficiency of the user can be provided with accuracy.

Moreover, based on the index E for the operation history of the user of the terminal device 10 to which the output controller 70 outputs the guide information, the operation selecting unit 68 sets the condition (search condition) for the index E for specifying a predetermined efficiency, and selects the operation history that matches with the set condition. In the information processor 12, since the operation history is selected based on the index E of the user for which the guide information is intended, an appropriate operation assistance information can be provided according to the proficiency of the user.

The operation history obtaining unit 60 obtains the operation histories of a plurality of users. Depending on whether or not the user of the operation history selected by the operation selecting unit 68 is identical to the user of the terminal device 10 to which the guide information is to be output, the output controller 70 outputs the multiple types of the guide information. In the information processor 12, since the different types of the guide information can be provided according to the operation efficiency of the users, an appropriate information for each of the users can be provided.

Meanwhile, the operation history includes the operation input information indicating the operation details input by the user at the terminal device 10. Based on the operation input information of the operation history extracted by the operation extracting unit 64, the index calculating unit 66 calculates the index E. The output controller 70 outputs the operation input information, which is included in the selected operation history, as the guide information. In the information processor 12, since the index E is calculated based on the operation input information, the operation efficiency can be evaluated with high accuracy and information that is helpful in improving the operation efficiency of the user can be provided with accuracy.

Moreover, the operation extracting unit 64 extracts the operations (the operation history groups) that include the multiple types of the operation details. Then, the index calculating unit 66 calculates the index E based on the multiple types of the operation details. In the information processor 12, since the index E is calculated based on multiple types of the operations, the operation efficiency can be evaluated with high accuracy and information that is helpful in improving the operation efficiency of the user can be provided with accuracy.

Furthermore, the index calculating unit 66 performs the different weighting for each of the multiple types of the operation details, and then calculates the index E. In the information processor 12, as a result of varying the weighting of the multiple types of the operation details, the operation efficiency can be evaluated with high accuracy, and information that is helpful in improving the operation efficiency of the user can be provided with accuracy.

Moreover, the index calculating unit 66 calculates the index E based on at least one of the operation time of the user, the input count of the user for the operating unit 24 of the terminal device, and the movement amount of the pointer of the terminal device 10, as the operation details. In the information processor 12, since the index E is calculated based on such operation details, the operation efficiency can be evaluated with high accuracy, and information that is helpful in improving the operation efficiency of the user can be provided with accuracy.

Furthermore, based on the indices E, the operation selecting unit 68 selects the user operations with the optimum efficiency. In the information processor 12, since the operations with the optimum efficiency are output, the user becomes able to check the operations with the high efficiency. Thus, the improvement in the efficiency of the device operations by the user can be assisted in a favorable manner.

Moreover, the information processing system 1 according to the first embodiment includes the information processor 12 and the terminal devices 10, which send the operation history to the information processor 12. In the information processing system 1, the improvement in the efficiency of the device operations by the users can be assisted in a favorable manner.

Second Embodiment

Given below is an explanation of a second embodiment. In the first embodiment, the operation amount of the user operations performed until the operation result is stored in the memory space 36 is treated as the index, and the user operations with a small operation amount are treated as the operations with the good efficiency. However, the operations with the good efficiency are not limited to the user operations with the small operation amount. Alternatively, for example, as explained in the second embodiment, the operations for which a power consumption of the terminal device 10 is low until the operation result is stored in the memory space 36 can be treated as the operations with the good efficiency. That is, the information processor 12 according to the second embodiment differs from the first embodiment in the way that the efficiency is evaluated based on the power consumption of the device instead of the operation amount of the user operations. In the second embodiment, the common constituent elements to the first embodiment are not explained again.

Figures 18, 19:
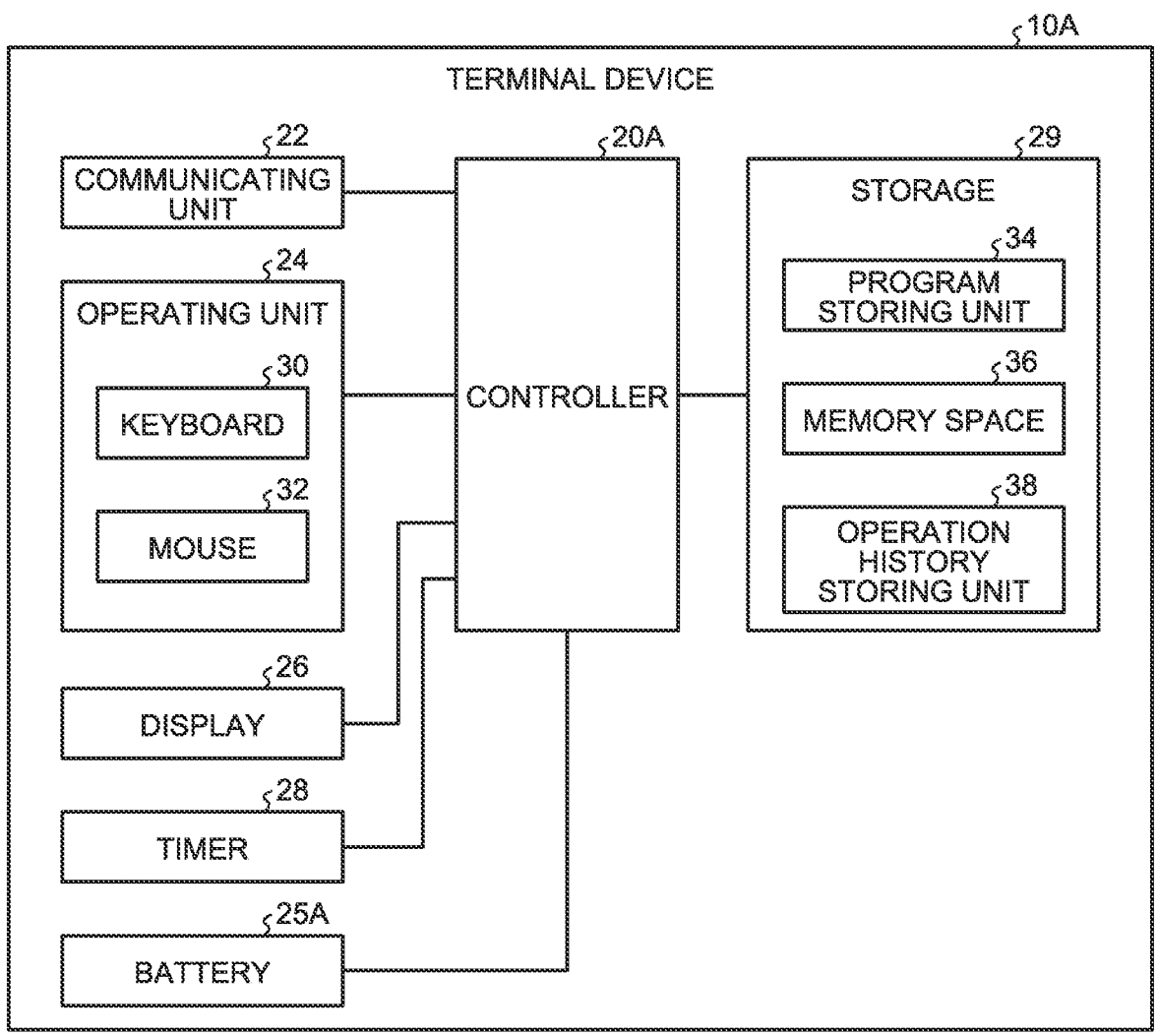
FIG. 18 is a diagram illustrating an example of a power consumption table according to a second embodiment.
FIG. 19 is a block diagram of a terminal device according to a third embodiment.

FIG. 18 is a diagram illustrating an example of a power consumption table according to the second embodiment. In the information processor 12 according to the second embodiment, a power consumption information indicating the relationship between the power consumption and the operation types is stored in the storage 46. That is, in the information processor 12, the power consumption table illustrated in FIG. 18 is stored as the power consumption information. As illustrated in FIG. 18, in the power consumption table, the power consumption per the operation amount is stored for each of the operation types. In the example illustrated in FIG. 18, following information is stored as the power consumption information: a power consumption "P1" per a unit time; a power consumption "P2" per a keystroke on the keyboard 30; a power consumption "P3" per a unit distance of a pointer movement; a power consumption "P4" per a click of the mouse 32; and a power consumption "P5" per a unit rotation angle of the wheel of the mouse 32. As the power consumption information, for example, values measured in advance by performing tests can be used. Meanwhile, the power consumption per a unit time is a power consumption of the terminal device 10. However, when the terminal device 10 and the monitor (the display 26) are configured separately, then the power consumption of the monitor can also be included. Moreover, the power consumption can be stored for each of setting conditions (such as a setting of brightness of a screen) of the display 26 or the monitor (the display device). Moreover, the power consumption per a unit time can include a power consumption of peripheral devices such as a speaker and a camera. Furthermore, the power consumption per a unit time can include a power consumption of operating units such as the keyboard 30 and the mouse 32. Moreover, the information processor 12 can store such power consumption information for each of types of the terminal devices 10 and for each of types of the peripheral devices. Furthermore, as the power consumption per a unit time, an average power consumption at a time of individually running a computer program which is a target for determining the operation efficiency can be used. In this case, the power consumption due to other computer programs and other processes can be excluded, and the power consumption due to the target program can be calculated with accuracy.

In the second embodiment, for the operation history group extracted by the operation extracting unit 64, the index calculating unit 66 calculates the power consumption as the index E based on the power consumption information. The index calculating unit 66 calculates, for all of the unit operation histories OP included in the extracted operation history group, the operation aggregate value for each of the operation types recorded in the power consumption information. For example, the index calculating unit 66 calculates a sum of the keystroke count of the keyboard 30 included in a single operation history group. Then, the index calculating unit 66 performs an arithmetic processing using the operation aggregate value and the power consumption for each of the operation types, and calculates the power consumption for each of the operation types. Then, the index calculating unit 66 calculates the index E by adding the power consumptions for all of the operation types. For example, the index calculating unit 66 calculates the index E for each operation history group using Equation (3) given below.

$$E = \varepsilon \cdot x + \lambda \cdot y + \eta \cdot z + \theta \cdot u + \mu \cdot v \qquad (3)$$

Herein, x represents the operation time of the user, y represents the keystroke count of the keyboard 30, z represents the movement distance of the pointer, u represents the click count of the mouse 32, and v represents the total rotation angle of the wheel of the mouse 32. These values (operation aggregate values) are calculated for each of the operation history groups. Moreover, $\varepsilon$, $\lambda$, $\eta$, $\theta$, and $\mu$ represent the power consumption per a unit operation amount for each of the operation types in the power consumption information, and are coefficients greater than zero. In the example illustrated in FIG. 18, $\varepsilon$ corresponds to "P1", $\lambda$ corresponds to "P2", $\eta$ corresponds to "P3", $\theta$ corresponds to "P4", and $\mu$ corresponds to "P5". Moreover, the index calculating unit 66 can calculate the index E, that is, the power consumption per an operation history group also by taking into account a brightness d of the monitor (the display 26) and a number w of the simultaneously-displayed windows. That is, the index calculating unit 66 can calculate the index E using, for example, Equation (4) given below.

$$E = h(d, w) \cdot x + \lambda \cdot y + \eta \cdot z + \theta \cdot u + \mu \cdot v \qquad (4)$$

Herein, h represents a function in which d and w are used as variables, and in which, greater the brightness d or greater the window count w, the greater is the output value.

In the second embodiment, the information processor 12 determines the operation efficiency using the indices E calculated in the manner explained above. That is, the information processor 12 determines that the operation with the smaller index E has the better efficiency from a perspective of the power consumption. Meanwhile, the power consumption information can be held in the terminal device 10. In this case, the terminal device 10 calculates the power consumption for each of the unit operation histories OP, and sends the operation history with the calculated power consumption to the information processor 12. The index calculating unit 66 calculates the index E using the power consumption calculated by the terminal device 10. For example, the sum of the power consumption for each of the unit operation histories OP in a single operation history group is calculated and treated as the index E. Alternatively, the terminal device 10 can calculate the index E and send it to the information processor 12.

As described above, in the information processor 12 according to the second embodiment, the power consumption of the terminal device 10 required until the operation result is stored in the memory space 36 is treated as the index E. Thus, in the information processor 12, the improvement in the efficiency of the device operations of the user can be preferably assisted from the perspective of power consumption. As described in the first and second embodiments, the information processor 12 can obtain, as the index E, at least one of the operation amount of the user operations required until the operation result is stored in the memory space 36 and the power consumption of the terminal device 10 required until the operation result is stored in the memory space 36. Moreover, it is also possible to combine the first embodiment with the second embodiment. That is, the index E obtained from a perspective of the operation amount calculated in the first embodiment and the index E obtained from a perspective of the power consumption calculated in the second embodiment can be used to determine the overall operation efficiency. For example, an overall index E can be calculated by adding a weighted index E1 indicating the operation amount of the user and a weighted index E2 indicating the power consumption related to the operations. Then, the guide information can be provided according to the operations identical to the first embodiment.

Third Embodiment

Given below is an explanation of a third embodiment. The third embodiment differs from the second embodiment in the way that the power consumption of the devices is directly measured. In the third embodiment, the common constituent elements to the second embodiment are not explained again.

FIG. 19 is a block diagram of a terminal device according to the third embodiment. As illustrated in FIG. 19, a terminal device 10A according to the third embodiment differs from the second embodiment in the way that a controller 20A detects remaining electrical power of a battery 25A. The controller 20A detects the remaining electrical power of the battery 25A.

Figure 20:
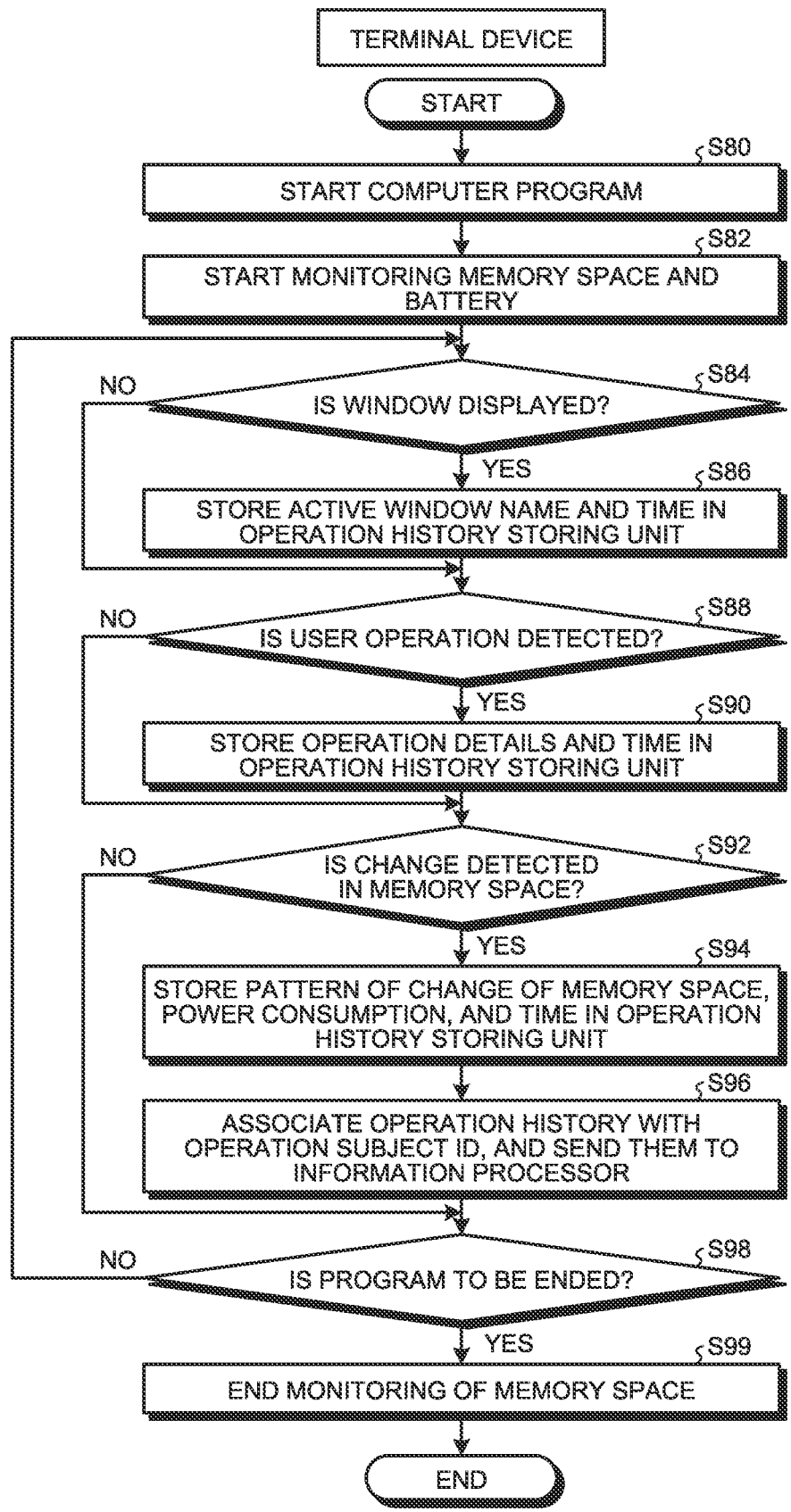
FIG. 20 is a flowchart for explaining a flow of processes performed at the terminal device according to the third embodiment.

FIG. 20 is a flowchart for explaining a flow of processes performed at the terminal device 10A according to the third embodiment. As illustrated in FIG. 20, the controller 20A starts a computer program upon detecting a predetermined user operation with respect to the operating unit 24 (the operation of activating the computer program) (Step S80).

Once the computer program is started, the controller 20A starts monitoring the memory space 36 and the battery 25A (Step S82). More particularly, the controller 20A monitors whether any change is detected in the value of the memory area M to which specific addresses are assigned in the memory space 36, and monitors the remaining electrical power of the battery 25A. Then, the controller 20A determines whether or not a window is displayed in the display 26 as a result of execution of the computer program (Step S84). The operations from Step S84 to Step S92 are identical to the operations from Step S14 to Step S22 illustrated in FIG. 5 according to the first embodiment. Hence, that explanation is not given again.

At Step S92, when a change in the memory space 36 is detected (Yes at Step S92), the controller 20A stores, in the operation history storing unit 38, the pattern of the change of the memory space 36, that is, the information about the operation result, the time read from the timer unit 28 at the time of the change in the memory space 36, and the power consumption (Step S94). The controller 20A detects the remaining electrical power of the battery 25A available before the user operations and detects the remaining electrical power of the battery 25A available after the user operations, subtracts the remaining electrical power of the battery 25A available after the user operations from the remaining electrical power of the battery 25A available before the user operations, and calculates the power consumption. The remaining electrical power of the battery 25A available before the user operations represents, for example, the remaining electrical power available just before the display of the window, and the remaining electrical power of the battery 25A available after the user operations represents, for example, the remaining electrical power available at the time of the change in the memory space 36. That is, the controller 20A calculates the power consumption for each of the operation history groups. Then, in the operation result field in the operation history table stored in the operation history storing unit 38, the controller 20A records the power consumption of each of the operation history groups with the address of the memory area and the value of that address.

Subsequently, the controller 20A associates the operation subject ID to the operation history, and sends them to the information processor 12 (Step S96). Then, the controller 20A determines whether or not to end the computer program (Step S98). When it is determined not to end the computer program (No at Step S98), the system control returns to Step S84 and the controller 20A again performs the processes. When it is determined to end the computer program (Yes at Step S98), the controller 20A ends the monitoring of the memory space 36 and the battery 25A (Step S99) to end the present process.

In this way, in the third embodiment, the information processor 12 obtains the operation history including the information about the power consumption. Then, the operation extracting unit 64 according to the third embodiment extracts the operation history groups in an identical manner to the first and second embodiments. Subsequently, the index calculating unit 66 according to the third embodiment reads, from the operation history, the power consumption for each of the operation history groups, and obtains the power consumption as the index E. In this case, the index calculating unit 66 does not calculate the index E but obtains it from the terminal device 10A. Thus, the index calculating unit 66 can be called an index obtaining unit. Also in the third embodiment, in an identical manner to the first embodiment, the information processor 12 determines that, smaller the value of the index E, the more efficient are the operations. That is, smaller the power consumption of the operations, the more efficient are they determined to be. Meanwhile, instead of calculating the power consumption for each of the operation history groups, the terminal device 10A can store the remaining electrical power for each of the unit operation histories OP. In this case, the information processor 12 can obtain the remaining electrical power for each of the unit operation histories OP, calculate the power consumption of a single operation history group by subtracting the remaining electrical power in the unit operation history OP indicating a change in the memory space 36 from the remaining electrical power in the unit operation history OP indicating the display of the window to have the index E.

Meanwhile, since a power consumption for the operations in a short period is a very small amount. Thus, in the third embodiment, the information processor 12 can record the power consumption for the same function F for several times, obtain an average power consumption, and treat the average power consumption as the index E. Meanwhile, when the power consumption is detected from the difference in the remaining electrical power of the battery 25A, since the older battery discharges quicker, the power consumption is likely determined to be large. Thus, the index E can be corrected based on a manufacturing year of the battery 25A or the terminal device 10. That is, the index E can be corrected to become smaller as the manufacturing year thereof for the operation history group becomes older. Moreover, when a plurality of computer programs is simultaneously used at the terminal device 10, it may be difficult to detect each of the power consumptions of each of the functions in each of the programs. Thus, the users operating in the similar environment can be compared. That is, the terminal devices 10 in which the same or similar number of computer programs are used can be compared. Moreover, according to the setting condition of the display 26 or the monitor (display device) (for example, the setting of the brightness of the screen), the measured power consumption can be corrected. For example, in the same operations, the terminal device 10A with the screen brightness set to be high (bright) consumes more power than the terminal device 10A with the screen brightness set to be low (dark). Thus, the value of the measured power consumption can be corrected to be smaller as the screen brightness is set to be higher. That is, in the same operations, regardless of the setting conditions of the display 26 or the monitor (display device), the correction process can be performed to obtain a uniform power consumption. Alternatively, from a perspective that a high screen brightness is required to be set for performing an operation requiring the high screen brightness (for example, an operation of minutely moving the pointer), the measured power consumption can be used without correction.

In the third embodiment, since the power consumption actually measured at the terminal device 10A is used, the power consumption information need not be prepared in advance unlike in the second embodiment. On the other hand, in the second embodiment, it is possible to reduce effect of other computer programs and disturbance factors to accurately calculate the power consumption related to the target computer program.

Meanwhile, instead of the power consumption, for example, a communication data volume can be monitored and can be treated as the efficiency of the user operations. For example, the information processor 12 can calculate the communication data volume for the operations as the index E, and can determine that, lower the communication data volume, the more efficient are the operations. Moreover, the operation efficiency can be determined by taking into account load on the terminal device 10. In this case, the index E can be calculated based on an extent of the load on the terminal device 10, such as an amount of heat generated in the terminal device, a rise in temperature in the terminal device 10, and the number of rotations of the motor included in the terminal device 10. In this case, smaller the extent of the load on the terminal device 10, the more efficient are the operations. Alternatively, the operation efficiency can be determined by taking into account a durability of the terminal device 10. For example, if the click count of ten million is guaranteed for the mouse 32 and if the keystroke count of thirty million is guaranteed for the keyboard 30, then a single click of the mouse 32 has less impact on a life thereof than the impact of a single keystroke of the keyboard 30 on a life thereof. Thus, when the same function F can be performed using either a single mouse click or a single keystroke on the keyboard, then it can be determined that using the keyboard 30 that has less impact on the life of the terminal device 10 is the efficient operation. Thus, the information processor 12 calculates the index E by, for example, setting the weighting of the click count of the mouse 32 to be larger than the weighting of the keystroke count of the keyboard 30. As a result of using such evaluation scale, the information processor 12 becomes able to provide the user with the information for the operation method that enables extending the life of the terminal device 10 as much as possible.

Meanwhile, in addition to the durability of the terminal device 10, the information processor 12 can also determine the operation efficiency by taking into account not only the durability, but also a price or a running cost of the terminal device 10. For example, assume that the click count of ten million is guaranteed for the mouse 32, the keystroke count of thirty million is guaranteed for the keyboard 30, the cost of the mouse 32 is 2000 yen, and the cost of the keyboard 30 is 10000 yen. In this case, by comparing the monetary value spent for each click of the mouse 32 (i.e., 2000 yen/ten million times) with the monetary value spent for each keystroke of the keyboard 30 (10000 yen/thirty million times), a decrease in the monetary value of the mouse 32 is smaller, and thus it can be determined that the operation by one click of the mouse 32 is more efficient than the operation by one keystroke of the keyboard 30. Thus, the information processor 12 calculates the index E by, for example, setting the weighting of the operations performed using the mouse 32 to be smaller than the weighting of the operations performed using the keyboard 30. As a result of using such evaluation standard, the information processor 12 becomes able to provide the user with the information for the operation method with a lesser running cost.

According to the present application, it becomes possible to improve the efficiency of the user operations.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A non-transitory computer readable storage medium that stores a computer program for causing a computer to execute:
  obtaining operation histories created by user operations at a terminal device;

identifying a function performed by the user operations as an operation target function based on the operation histories;

extracting operation histories created by multiple users for an identical or similar function from the operation histories based on information about the operation target function;

calculating, for each of the multiple users, an index value which indicates a level of efficiency of the operations based on the operation histories created by the multiple users for the identical or similar function;

generating, by comparing index values of the multiple users with each other, a guide information for improving the efficiency of operations based on operation histories of another user who is different from a target user and has a higher index value than that of the target user; and outputting the guide information to the terminal device used by the target user, wherein the computer program further causes the computer to execute:
  on the identifying, grouping multiple operation histories from displaying a window in the terminal device till storing an operation result by the user operations in the memory space to create operation history groups;
  identifying the function for each of the operation history groups;
  on the calculating, calculating the index value for each of the operation history groups by aggregating values indicating operation amounts of a user; and
  on the calculating, calculating the index value, by calculating, for each of the operation groups, the operation amount of the operation for each of the users and a power consumption of the terminal device, such that the level of efficiency of the operations is higher as the operation amount is lower and the power consumption is lower;

wherein
  each of the operation history groups includes a click count of a button operated by a user;
  a power consumption table includes information on a power consumption per one click; and
  the index value is calculated based on a value obtained by multiplying the click count of the button included in each of the operation history groups with the power consumption per one click in the power consumption table.

2. A non-transitory computer readable storage medium that stores a computer program for causing a computer to execute:

obtaining operation histories created by user operations at each of multiple terminal devices;

grouping a series of multiple operation histories for performing a predetermined function by the user operations at each of the multiple terminal devices to create operation history groups;

calculating, for each of the operation history groups by the user operations, an index value which indicates a level of efficiency of the operations;

generating, by comparing the index values of the multiple users with each other, a guide information for improving the efficiency of operations based on operation histories of another user different from a target user and has a higher index value than that of the target user; and outputting the generated guide information to the terminal device used by the target user, wherein the computer program further causes the computer to execute:
  on the calculating, calculating a power consumption for an operation amount of the user operations for each of the operation histories based on a power consumption table in which the power consumption per the operation amount is stored; and
  calculating the index value such that the level of efficiency of the operations is higher as the calculated power consumption is lower;

wherein
  each of the operation history groups includes a click count of a button operated by a user;
  the power consumption table includes information on a power consumption per one click; and
  the index value is calculated based on a value obtained by multiplying the click count of the button included in each of the operation history groups with the power consumption per one click in the power consumption table.

3. The non-transitory computer readable storage medium according to claim 2, wherein
  the operation history groups are created by grouping a series of multiple operation histories from displaying a window in the terminal device till storing a result of performing the predetermined function by the user operations in a memory space.

4. The non-transitory computer readable storage medium according to claim 2, wherein
  each of the operation history groups includes a keystroke count of a keyboard operated by a user;
  the power consumption table includes information on a power consumption per one keystroke count; and
  the index value is calculated based on a value obtained by multiplying the keystroke count included in each of the operation history groups with the power consumption per one keystroke count in the power consumption table.

5. The non-transitory computer readable storage medium according to claim 2, wherein
  each of the operation history groups includes a movement amount of a pointer operated by a user;
  the power consumption table includes information on a power consumption per unit distance of a pointer movement; and
  the index value is calculated based on a value obtained by multiplying the movement amount of the pointer included in each of the operation history groups with the power consumption per unit distance of the pointer movement in the power consumption table.

6. The non-transitory computer readable storage medium according to claim 2, wherein
  each of the operation history groups includes a required operation time by a user;
  the power consumption table includes information on a power consumption per unit time; and
  the index value is calculated based on a value obtained by multiplying the required operation time included in each of the operation history groups with the power consumption per unit time in the power consumption table.

7. A non-transitory computer readable storage medium that stores a computer program for causing a computer to execute:

grouping a series of multiple operation histories for performing a predetermined function by user operations at a terminal devices to create operation history groups;

calculating a power consumption for each of the operation history groups at the terminal devices;

sending information on each of the operation history groups and the power consumption thereof to an information processor;

receiving, from the information processor, a guide information including operation histories of a user who has a higher level of efficiency of the operations than that of a target user of the terminal device; and displaying, on a display, the operation histories of the target user and the operation histories of the user who has the higher level of efficiency of the operations than that of the target user in a comparative manner, wherein the guide information is generated in the information processor by comparing index values each of which indicates the efficiency of the operations for each of the operation history groups of multiple users; and the index value is calculated such that the level of efficiency of the operations is higher as the calculated power consumption is lower;

wherein
each of the operation history groups includes a click count of a button operated by a user; and the index value is calculated based on a value obtained by multiplying the click count of the button included in each of the operation history groups with a power consumption per one click according to a power consumption table in which information on the power consumption per one click is stored.

8. The non-transitory computer readable storage medium according to claim 7, wherein the operation history groups are created by grouping a series of multiple operation histories from displaying a window in the terminal device till storing a result of performing the predetermined function by the user operations in a memory space.

9. The non-transitory computer readable storage medium according to claim 7, wherein each of the operation history groups includes a keystroke count of a keyboard operated by the user; and the index value is calculated based on a value obtained by multiplying the keystroke count included in each of the operation history groups with a power consumption per one keystroke count according to a power consumption table in which information on the power consumption per one keystroke count is stored.

10. The non-transitory computer readable storage medium according to claim 7, wherein each of the operation history groups includes a movement amount of a pointer operated by a user; and the index value is calculated based on a value obtained by multiplying the movement amount of the pointer included in each of the operation history groups with a power consumption per unit distance of a pointer movement according to a power consumption table in which information on the power consumption per unit distance of the pointer movement in the power consumption table.

11. The non-transitory computer readable storage medium according to claim 3, wherein each of the operation history groups includes a required operation time by a user; and the index value is calculated based on a value obtained by multiplying the required operation time included in each of the operation history groups with a power consumption per unit time according to a power consumption table in which information on the power consumption per unit time is stored.

12. The non-transitory computer readable storage medium according to claim 7, wherein on the calculating, a power consumption of a battery of the terminal device from displaying a window in the terminal device till storing a result of performing the predetermined function by the user operations in a memory space is calculated.

13. The non-transitory computer readable storage medium according to claim 7, the computer program further causes the computer to execute:

detecting an operation of displaying a predetermined window on the terminal device; and sending a guide information request in which information on a function performed in the terminal device by the operations for the displayed window is included to the information processor, wherein the guide information includes the operation histories when the function included in the guide information request has been performed on another terminal device.

* * * * *